United States Patent [19]
Toh

[11] Patent Number: 5,987,011
[45] Date of Patent: Nov. 16, 1999

[54] ROUTING METHOD FOR AD-HOC MOBILE NETWORKS

[75] Inventor: Chai Keong Toh, Singapore, Singapore

[73] Assignees: Chai-Keong Toh, Singapore, Singapore; King's College, United Kingdom

[21] Appl. No.: 08/705,817

[22] Filed: Aug. 30, 1996

[51] Int. Cl.⁶ .............................. H04Q 7/00; H04Q 7/32
[52] U.S. Cl. ................. 370/331; 370/255; 455/450
[58] Field of Search ................................. 370/311, 312, 370/400, 401, 402, 369, 331, 256, 408, 428, 429, 468, 216, 255, 455, 228; 455/69, 523, 450, 452, 453, 509; 320/255, 256

[56] References Cited

U.S. PATENT DOCUMENTS

| | | | |
|---|---|---|---|
| 4,825,206 | 4/1989 | Brice et al. | 370/216 |
| 5,093,824 | 3/1992 | Coan et al. | 370/228 |
| 5,117,422 | 5/1992 | Hauptschein et al. | 370/255 |
| 5,412,654 | 5/1995 | Perkins | 370/312 |
| 5,442,633 | 8/1995 | Perkins et al. | 370/331 |
| 5,444,707 | 8/1995 | Cerna et al. | 370/468 |
| 5,533,025 | 7/1996 | Fleek et al. | 370/445 |
| 5,570,084 | 10/1996 | Ritter et al. | 3710/349 |
| 5,579,373 | 11/1996 | Jang | 455/436 |
| 5,592,468 | 1/1997 | Sato | 370/252 |
| 5,654,959 | 8/1997 | Baker et al. | 370/331 |
| 5,812,531 | 9/1998 | Cheung et al. | 370/255 |

OTHER PUBLICATIONS

Toh, Chai–Keong, "A Novel Distributed Routing Protocol To Support Ad–Hoc Mobile Computing", pp. 480–486 (1996).

*Primary Examiner*—Chi H. Pham
*Assistant Examiner*—Steven Nguyen
*Attorney, Agent, or Firm*—Sterne,Kessler, Goldstein & Fox P.L.L.C.

[57] ABSTRACT

A routing method for supporting ad-hoc mobile communications within a radio communications network. The network comprises a plurality of mobile hosts including a source mobile host and a destination mobile host, and a plurality of radio communications links connecting together with mobile hosts. The method comprises measuring the stability of the communications links between neighbouring mobile hosts using an associativity based characteristic and selecting a communications route through the network from the source mobile host to the destination mobile host based on the stability of the communications links. The associativity characteristic is measured by each mobile host periodically transmitting and receiving identifier beacons (ticks) and updating the status of its corresponding links. The greater the number of ticks associated with a given link, the greater its stability. Use of the associativity characteristic enables the routing method to deal efficiently with mobile host migrations throughout the network.

30 Claims, 14 Drawing Sheets

FLOWCHART FOR ROUTE DISCOVERY
(AT THE DESTINATION NODE)

ROUTING METHOD FOR AD-HOC MOBILE NETWORKS

BACKGROUND OF THE INVENTION

1. Field of the Invention

The present invention relates to a novel routing method specifically adapted for use with ad-hoc mobile networks and more particularly though not exclusively to a routing method where communications between source and destination mobile hosts is carried out across a conference size packet radio network of mobile hosts.

2. Status of the Prior Art

Ad-hoc mobile networks have recently become important in the field of mobile communications particularly with respect to mobile computer supported collaborative work. An Ad-hoc mobile network comprises a plurality of mobile hosts each being able to communicate with its neighbouring mobile hosts which are a single radio hop away. In such a network, each mobile host acts as a router forwarding packets of information from one mobile host to another.

Ad-hoc mobile networks differ from infra-structured wireless local area networks in that they do not have any access to base stations. Rather, in an ad-hoc mobile network, the mobile hosts have always to be able to communicate with each other over a wireless media without any infra-structured (wired) network component support. Accordingly, one of the most important features of any routing method or protocol for an ad-hoc mobile network, is the ability to adapt well to link changes, namely changes in the interconnectivity between mobile hosts due to mobile hosts' migrations. Ideally, mobile hosts should not spend most of their time updating and computing routes in sympathy with other mobile hosts' movements. However, conventional distributed routing schemes attempt to maintain consistent routing information by performing periodic link and topology updates. These updates are undesirable because of the frequent link changes occurring in ad-hoc mobile networks, which can result in an enormous number of transmissions over the wireless media to propagate and update routes. This is highly impractical, very inefficient and results in low data throughput in an environment where radio bandwidth and battery power are scarce resources.

One of the earliest deployments of a regional-wide wireless data network was the ARPANET Packet Radio Network (PRN) by Kohn, Gronemeyer, Burchfiel and Kunzelman. As shown in FIG. 1, all components (repeaters R. terminals T and stations S) in a PRN can be mobile or certain components can remain fixed while others are moving. There are two approaches used in a PRN for routing and packet forwarding. In "point-to-point" routing, the station computes all the routing information and the decision is either distributed to the repeaters involved in the route or to the source. This scheme is only suitable for slow moving user terminals. However, in "broadcast routing", each packet radiates away from the source with a wave-front-like propagation. Since no station needs to be present to compute routes, the destination address serves to identify the intended recipient. For fast moving user terminals, broadcast routing is preferred over point-to-point routing as it avoids the need to process rapidly changing routes.

In the connectionless approach to packet forwarding, some background operation is required to maintain up-to-date network topology and link information in each node. Accordingly, as network topology changes, the background routing traffic required in using the connectionless approach can be substantial. The connectionless approach is commonly associated with broadcast routing, where each packet carries sufficient routing information for it to arrive at the destination. However, in the connection-oriented approach, an explicit route establishment phase is required before data traffic can be transported. The connection-oriented approach is commonly associated with point-to-point routing, where each node in a route has a look up table for forwarding incoming packets to the respective out-going links. The disadvantage of the connection-oriented approach is that if the network topology changes, a route re-establishment phase is required.

Several ad-hoc mobile routing schemes have evolved over the past few years. Most of these schemes are based on either broadcast or point-to-point routing using either the connectionless or connection-oriented packed forwarding approach.

The "Layer Net" self-organising protocol proposed by Bhatnagar and Robertazzi uses a connectionless packet forwarding approach. Broadcast routing is used for the initial network connectivity construction and the subsequent topology maintenance as a result of nodes' movements and link changes. Network topology updates have to be performed in sympathy with link changes and routes are not constructed based on demand. Accordingly, the overall signalling traffic can be quite substantial.

Cluster-based routing by Krishna, Chatterjee, Vaidya and Pradhan uses the broadcast routing and connectionless packet forwarding approach. Cluster-based routing relies on existing routing schemes such as link-state or distance-vector routing to derive network topology and link information. In addition, a clustering methodology is used to reduce the number of updates due to mobile hosts' migrations. Routes are constructed between all pairs of nodes and route maintenance is essentially cluster maintenance. The disadvantage of cluster-based routing is that the method is inefficient.

Source-initiated distributed routing by Corson and Ephremides uses a combination of point-to-point and broadcast routing using the connection-oriented packet forwarding approach. Here routes are initiated by the source and are constructed based on demand, and so this method forgoes the need to constantly propagate up-to-date routing information throughout the network. However, because alternate route information is used during route re-construction, problems associated with stale routes exist.

The Destination Sequence Distance-Vector routing scheme proposed by Perkins and Bhagwat is an enhancement of the existing distance-vector Bellman-Ford routing, so that ad-hoc mobile networking can be supported. Because each mobile host has to periodically advertise its view of the network topology, this scheme is inefficient. Similar to cluster-based routing, the broadcast routing and connectionless packet forwarding approach is adopted.

Dynamic source routing for mobile networks by Johnson avoids periodic route advertisements because route caches are used to store source routes that a mobile host has learnt over time. A combination of point-to-point and broadcast routing using the connection-oriented packet forwarding approach is used. Routes are source-initiated and discovered via a route discovery protocol. With source routing, the sender explicitly lists the route in each packet's header, so that the next-hop nodes are identified as the packet travels towards the destination. Cached route information is used and accurate updates of these route caches are essential, otherwise routing loops can occur. Since the sender has to be notified each time a route is truncated, the route maintenance phase does not support fast route reconstruction.

SUMMARY OF THE INVENTION

In view of the foregoing, the main object of this invention is to provide an improved routing method that provides efficient and high throughput communication between mobile hosts in an ad-hoc mobile network and which can deal effectively and efficiently with mobile hosts' migrations that effect the validity of routes through the mobile network.

Another object of the invention is to provide a routing method which avoids network congestion due to unfair burdening of a particular mobile host to support many routes and to perform many information relaying functions.

Yet another object of the present invention is to provide a routing method which is able efficiently to handle concurrent movement of a plurality of mobile hosts in an ad-hoc mobile network.

Still another object of the present invention is to provide a routing method which is able readily to incorporate new mobile hosts into the ad-hoc network without requiring vast amounts of information about the new mobile host.

A still further object of the invention is to provide a routing method which avoids packet duplicates, stale routes, loops and deadlock, but does this efficiently without requiring vast amounts of memory, bandwidth or power.

Briefly stated, these objects are attained in a routing method in which the stability of routes through an ad-hoc mobile communications network is measured using an associativity characteristic and selection of a particular route for transmission of information is based on that particular route's stability.

The associativity characteristic, which is simply a measure of the stability of a particular link between neighbouring mobile hosts, is measured by each mobile host periodically transmitting and receiving identifier beacons (ticks) and updating the status of the corresponding links. The greater the number of ticks associated with a given link, the greater its stability or longevity.

More particularly, according to one aspect of the present invention there is provided a routing method for supporting ad-hoc mobile communications within a communications network, the network comprising a plurality of mobile hosts including a source mobile host and a destination mobile host and a plurality of communication links connecting together said plurality of mobile hosts, said method comprising: periodically transmitting and receiving identifier signals via said communication links between neighbouring mobile hosts measuring the stability of said communication links between neighbouring mobile hosts in accordance with the number of identifier signals received via said communication links selecting a communications route through the network from the source mobile host to the destination mobile host based on the stability of said communications links; and transmitting an information signal from said source mobile host across said network via said selected communications route to said destination mobile host.

In an embodiment of the present invention, associativity tables are provided at each mobile host, each associativity table storing the stability for each of the communications links of the particular mobile host. In addition, the forwarding delay associated with each communication link is provided at each mobile host. Accordingly, the stability and transmission delay information associated with each communications link can be accessed and collated to determine the most viable route through the communications network.

Each mobile host preferably comprises a routing table which is configurable to set a route for passing information signals through the mobile host from one of its neighbours to others of its neighbours. The routing tables advantageously enable the mobile hosts to be arranged to support a plurality of routes through the network between various source and destination mobile hosts. In addition, each mobile host preferably has the ability to store route relaying load information regarding the total number of selected routes supported by the mobile host. Accordingly, the route selection procedure can consider the route relaying load information and avoid the selection of a route that would unfairly burden a particular mobile host.

Seen tables may also be provided at each mobile host. Each seen table records identifier data regarding information signals which have already passed through the mobile host. The seen tables can then be used to discard information signals that have previously passed through the mobile host. In the situation where the information signal is provided in data packets, provision of seen tables can avoid duplicate packets from being transmitted around the network.

The routing method preferably comprises providing a data flow acknowledgement mechanism comprising active and passive acknowledgements. The passive acknowledgement comprises receiving at a mobile host an information signal previously sent by the mobile host to one of its neighbouring mobile hosts and which has been retransmitted back thereby. The active acknowledgement occurs when an information signal has reached its destination and retransmission of that signal would not occur passively. In this case, that signal is retransmitted actively by the destination mobile host. Furthermore, the data flow acknowledgement preferably includes retransmitting the previously sent signal from the mobile host to the neighbouring mobile host if a passive or active acknowledgement is not received within a predetermined time-out period.

The present invention also provides a routing protocol for supporting ad-hoc mobile communications within a communications network, the network comprising a plurality of mobile hosts, and a plurality of communication links connecting together said mobile hosts, said protocol comprising: a procedure for measuring the stability of the communications links between neighbouring mobile hosts in accordance with the number of identifier signals received via said plurality of communication links by periodically transmitting and receiving said identifier signals via said plurality of communication links; a procedure for selecting a communications route through the network based on the stability of said communications links; and a procedure for restoring a selected communications route which has been invalidated due to movement of a mobile host previously supporting the selected route, the restoring procedure establishing a new route through the network based on the existing stability between mobile hosts.

According to a further aspect of the present invention there is provided an ad-hoc mobile communications network for supporting mobile communications, said network comprising: a plurality of mobile hosts including a source mobile host which desires to transmit information and a destination mobile host to which said information is to be sent; a plurality of wireless communications links connecting together said plurality of mobile hosts; and a control algorithm implemented by said plurality of mobile hosts for establishing and maintaining a communications route from the source mobile host to the destination mobile host based on the stability of the communications links therebetween, the stability being determined by periodically transmitting and receiving identifier signals via said communication links and measuring the number of identifier signals received via said communication links.

BRIEF DESCRIPTION OF THE DRAWINGS

For a better understanding of the invention as well as other objects and further features thereof, reference is made to the following detailed description to be read in conjunction with the accompanying drawings, wherein.

DETAILED DESCRIPTION OF THE EMBODIMENT

Hereinafter is described a method and protocol for supporting ad-hoc mobile computing within a radio communications network embodying the present invention. The communications network comprises a plurality of mobile hosts including a source mobile host and a destination mobile host, and a plurality of radio communications links connecting together the mobile hosts. However, before describing the above embodiment in detail, it is important to understand the principles behind the associativity characteristic and how it can be used in the routing method of the present embodiment.

Figure 1:
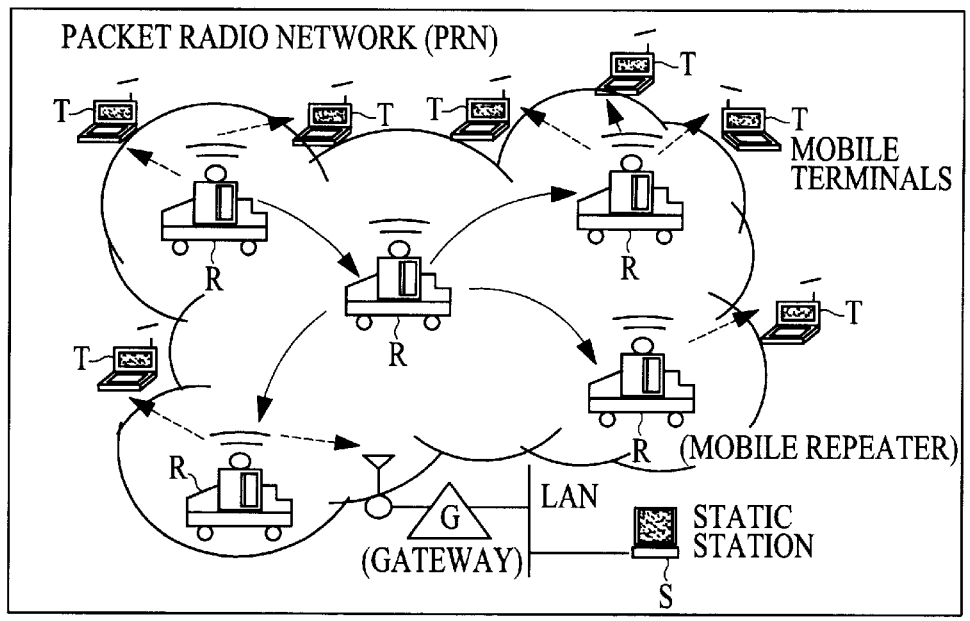
FIG. 1 is a schematic diagram showing the prior art arrangement of a Packet Radio Network.
Figure 2:
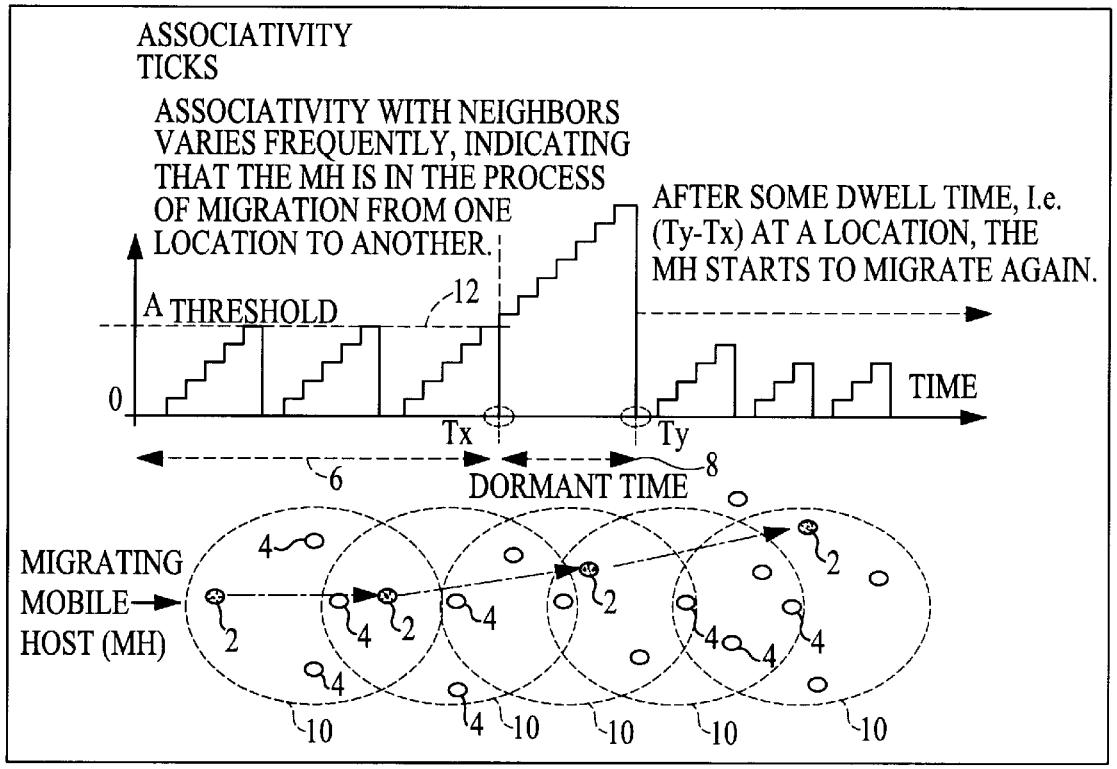
FIG. 2 is a graphical representation showing how the general property of associativity of a mobile host with its neighbours' varies with time and space.

Referring now to FIG. 2, the associativity characteristic is measured by each mobile host 2 periodically transmitting and receiving identifier beacons (ticks) via the mobile host's data-link layer protocol and updating the status of its corresponding links. The greater the number of ticks associated with a given link, the greater its stability. A mobile host's 2 association with its neighbours 4 changes as it is migrating and its transit period 6 can be identified by the associativity ticks. The migration is such that after this unstable period 6, there exists a period of stability 8, where the mobile host 2 will spend some dormant time within a wireless cell 10 before it starts to move again causing link changes with the mobile host's neighbours 4. The threshold where the associativity transitions take place is defined by $A_{threshold}$ 12, as shown in FIG. 2.

In a scenario where an ad-hoc Wireless Local Area Network has a wireless cell size of 10 m with a mobile host's minimum migration speed of 2 m/s and a beacon transmission interval of a second, the maximum possible number of associativity ticks of the migrating mobile host 2 with its neighbours 4 is five. Likewise, the neighbouring mobile hosts 4 will also record associativity ticks of no more than five. This value is the $A_{threshold}$ 12 and any number of associativity ticks greater than this threshold 12 implies periods 8 of association stability.

Figure 3:
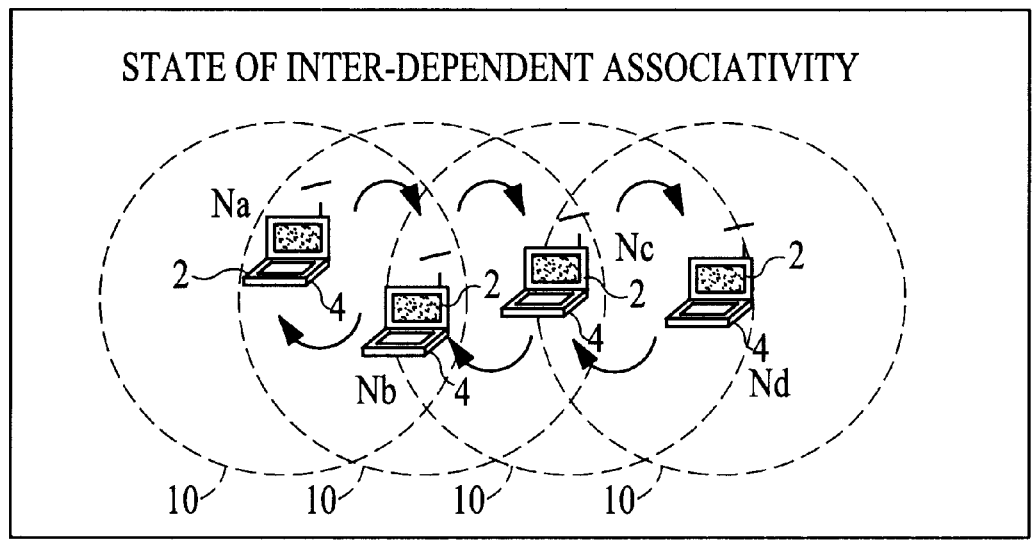
FIG. 3 is a schematic diagram showing the state of interdependent associativity found in mobile ad-hoc networks.

A mobile host 2 is said to exhibit a high state of mobility when it has a low number of associativity ticks with its neighbours 4. On the other hand, if a high number of associativity ticks are observed, the mobile host 2 is in the stable state 8 and this is the ideal point to select the mobile host 2 to perform ad-hoc routing. Consequently, if all the mobile hosts 2 in a route have a high number of associativity ticks, an inter-dependent phenomenon arises where "my" degree of associativity will be high if "you" do not move out of reachability (i.e., a symmetric mutual-dependent property) and are in stable state, as illustrated in FIG. 3. The number of associativity ticks are reset when the neighbours 4 or the mobile host 2 itself moves out of proximity, not when the communication session is completed and the route made invalid.

Every ad-hoc mobile network comprises a source mobile host (source node) which desires to transmit information across the network, a destination mobile host (destination node) which is the intended recipient of the information, and intermediate mobile hosts (intermediate nodes) which are configurable to relay the information between the source node and the destination node. For the sake of clarity, hereinafter the direction from the source node to the destination node will be referred to as downstream and the direction from the destination node to the source node as upstream. Movements of any of these mobile hosts (source, destination or intermediate nodes) can affect the validity of a selected communication route directly.

A source node in a route has a downstream link and when it moves out of its downstream neighbour's radio coverage range, the existing route will immediately become invalid. Hence, all the downstream nodes may have to be informed so as to erase their invalid route entries. Likewise when the destination node moves out of the radio coverage range of its upstream neighbour, the route becomes invalid. However, unlike the earlier case, the upstream nodes will have to be informed so as to erase their invalid route entries. In addition, any movements by one of the intermediate nodes supporting an existing route may cause the route to become invalid. In reality, concurrent moves by source, destination and intermediate nodes exist and require multiple responses by the routing protocol. All these nodes' movements cause many conventional distributed routing protocols to respond in sympathy with the link changes, in order to update all the remaining nodes within the network so that consistent routing information can be maintained. This involves broadcasting over the wireless medium which disadvantageously results in wasteful bandwidth and an increase in the overall network control traffic. However, use of the associativity characteristic at each mobile host automatically updates routing information thereby avoiding this prior art disadvantage.

Figure 4:
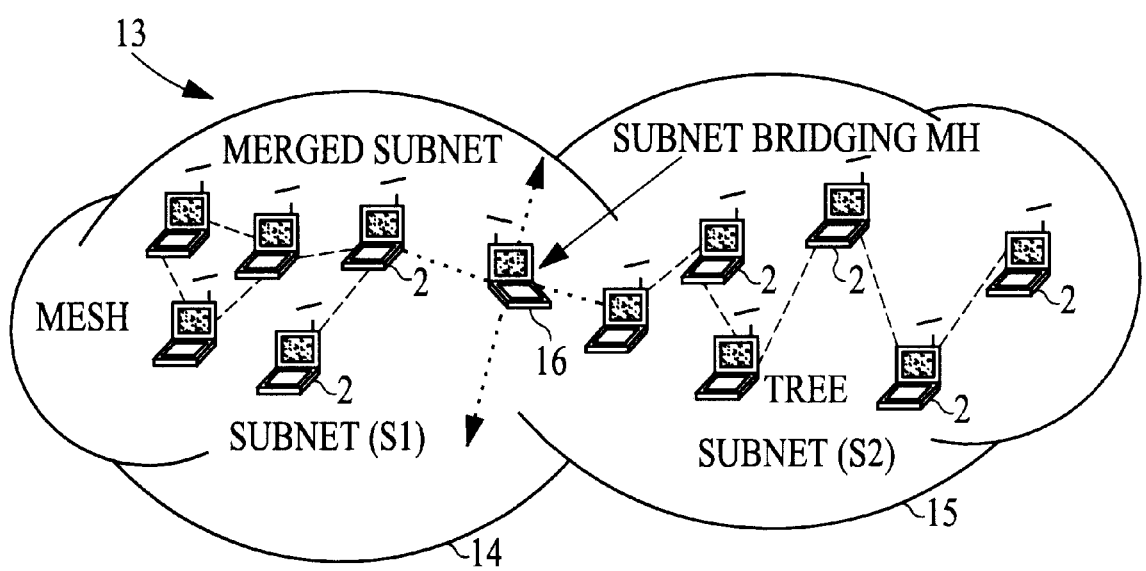
FIG. 4 is a schematic diagram showing how the merging of two communication sub-nets forms a larger communication network.

Referring to FIG. 4, there is shown a merged subnet 13 of mobile hosts 2. The merged subnet 13 comprises two subnets 14,15 linked by a subnet bridging mobile host 16. Moves by a mobile host 16 which is performing subnet-bridging function between two mobile subnets 14,15 can fragment the merged mobile subnet 13 into smaller subnets 14,15. The property of a mobile subnet states that if both the source node and destination node are part of the same subnet, a route or routes should exist unless the subnet is partitioned by some subnet-bridging mobile hosts 16. On the other hand, moves by certain mobile hosts can also result in subnets 14,15 merging, giving rise to bigger subnets 13 as is illustrated in FIG. 4. When the mobile subnets 14,15 merge to form bigger subnets 13, the routing protocol may typically accept the new subnet 13 by updating all the nodes' routing tables but this is very inefficient. However, use of the associativity characteristic is much more efficient because it updates only the affected mobile hosts' associativity tables, which is already an inherent part of the mobile hosts' radio data-link layer functions. Likewise, this applies to partitioning subnets.

From an application perspective, mobile subnets can be used to support nomadic collaborative computing, and the collaboration partners can grow in size when two collaborating groups join or when new mobile users join by coming into range.

Turning now to the embodiment of the present invention, the method comprises measuring the stability of the communications links between neighbouring mobile hosts using the associativity based characteristic and selecting a communications route through the network from the source mobile host to the destination mobile host based on the stability of the communications links. Use of the associativity characteristic also enables the routing method to deal effectively with route invalidation caused by mobile host migrations.

The method of the present embodiment is hereinafter referred to as Associativity-Based Routing (ABR). ABR is a compromise between broadcast and point-to-point routing and uses the previously mentioned connection-oriented packet forwarding approach. ABR only maintains routes for source mobile hosts that actually desire routes. However, ABR does not employ route reconstruction based on alternative route information stored in intermediate nodes, which advantageously avoids stale routes. In addition, routing decisions are performed at the destination mobile host and only the best route will be selected and used while all other possible routes remain passive, thereby avoiding packet duplicates. Furthermore, the selected route tends to be more long-lived due to the property of associativity.

The ABR protocol comprises three different phases, namely a Route Discovery phase, a Route Reconstruction (RRC) phase and a Route Deletion phase.

Initially, when a source node desires a route, the route discovery phase is invoked. When a link of an established route changes due to source node, destination node, intermediate node or subnet-bridging mobile hosts migration, the RRC phase is invoked. When the source node no longer desires the route, the route deletion phase is initiated.

The route discovery phase allows an approximation of the data throughput associated with the selected route to be computed. This is achieved through the knowledge of associativity ticks of neighbours in the route and a relaying load of each node supporting the route a parameter provided at each node in the network. The route discovery phase consists of a broadcast query (BQ) and await reply (REPLY) cycle.

BQ-REPLY cycle

Initially, all nodes except those of the destination node's neighbours have no routes to the destination node. A node desiring a route to the destination node broadcasts a BQ packet, which is propagated throughout the ad-hoc mobile network in search of mobile hosts which have a route to the destination node. A sequence number (SEQ NO.) is used to uniquely identify each BQ packet and no BQ packet is broadcast more than once.

Figure 5A:
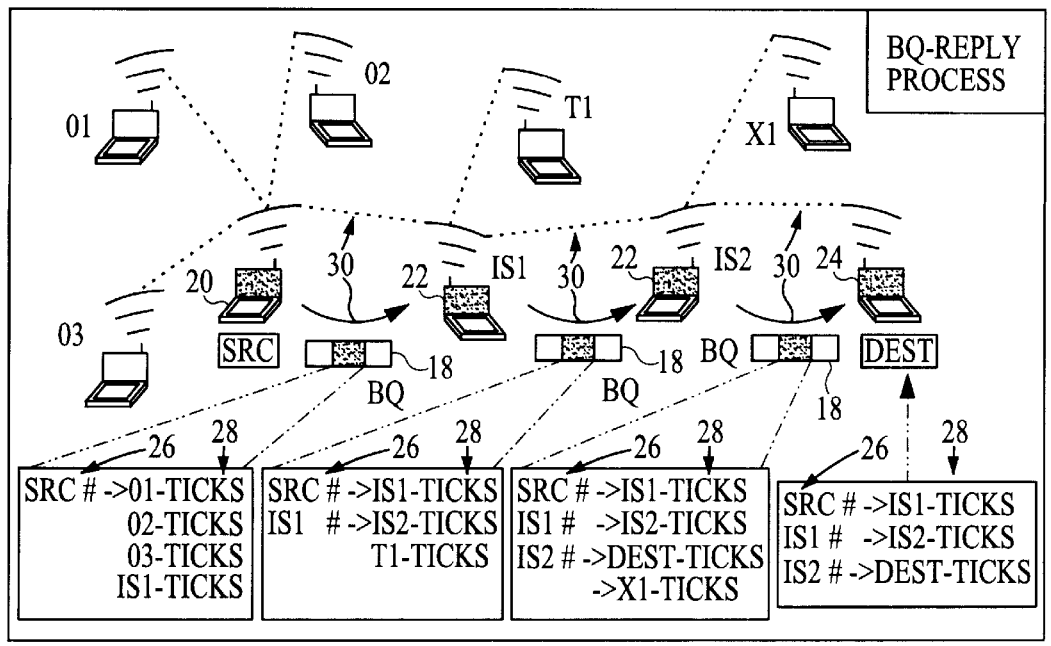
FIG. 5a is a schematic diagram showing how the associativity metric is utilised during a route discovery procedure of an embodiment of the present invention.

Referring now to FIG. 5a, once the BQ packet 18 has been broadcast by the source node 20, all neighbouring nodes 01, 02, 03, IS1 that receive the packet 18 check if they have previously processed the BQ packet 18. If affirmative, the BQ packet 18 is discarded, otherwise the neighbouring node 01, 02, 03, IS1 checks if it is the destination node 24. If it is not the destination node 24, the neighbouring node 01, 02, 03, IS1 appends its mobile host address 26 at the intermediate node identification (ID) field of the BQ packet 18 and broadcasts it to its neighbours (if it has any). The number of associativity ticks 28 with its neighbours will also be appended to the BQ packet 18 along with its route relaying load and forwarding delay information.

The retransmissions from the neighbouring nodes 01, 02, 03, IS1 all return back to the source node 20 where they are discarded. However, one of the neighbouring nodes IS1 which is called an intermediate node 22, transmits the BQ packet 18 to its neighbouring nodes T1, IS2 where the above described procedure is repeated.

Figure 5B:
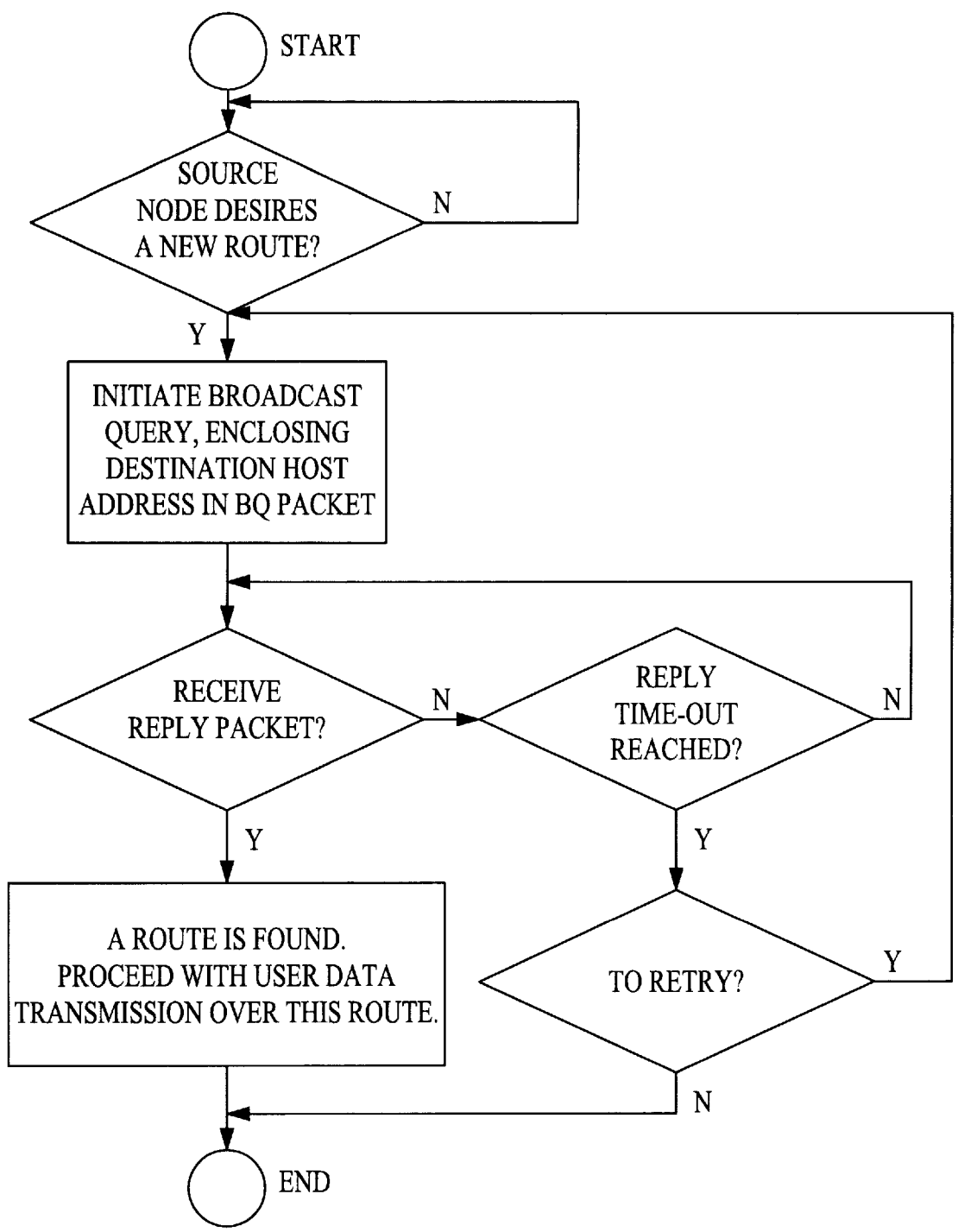
FIG. 5b is a flow diagram showing the steps involved in carrying out the route discovery procedure at the source node in the embodiment of the present invention.

The next succeeding intermediate node 22, IS2 will then erase its upstream node's neighbours' associativity ticks entries 28 and retain only those concerned with itself and its upstream node. In addition, because of the association ticks 28 symmetry between nodes, the associativity ticks 28 received from the upstream node can be checked for validity. The above described route discovery procedure carried out at the source node is illustrated in the flow chart of FIG. 5b.

Figure 6A:
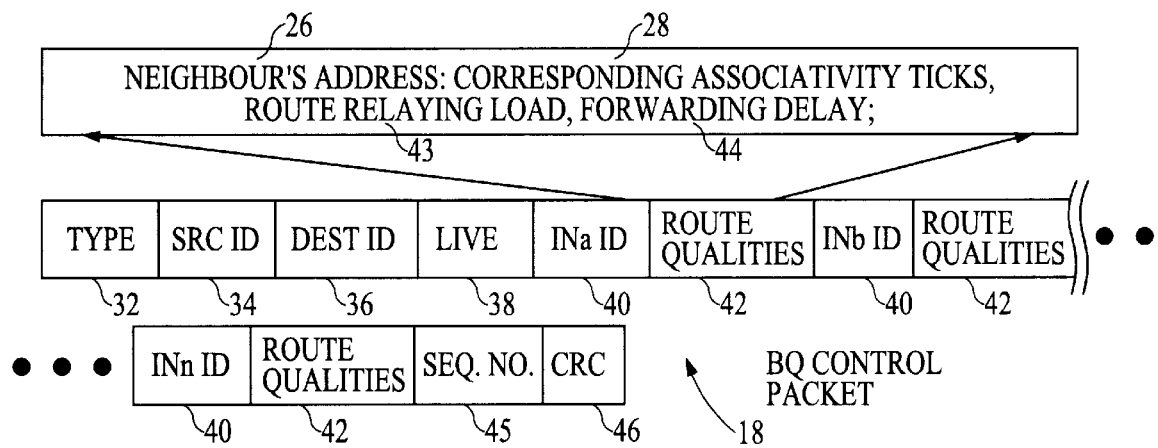
FIG. 6a is a block diagram showing the format of a BQ control packet used in the embodiment of the present invention.

In this manner, the BQ packet 18 reaching the destination node 24 will only contain the intermediate mobile hosts addresses 26 (hence recording the route 30 taken) and their respective associativity ticks 28 (hence recording the stability state of the intermediate nodes 22 supporting the route 30) and the route relaying load, together with information on route propagation delays and hop count. (The route hop count can be deduced from the number of intermediate nodes 22 in the route 30). The resulting BQ packet 18 is variable in length and its format is shown in FIG. 6a.

The BQ packet 18 incorporates several fields including a type field 32 which identifies the type of packet that is being transmitted and allows appropriate prioritisation to be given to its handling. The BQ packet 18 also has a source node identifier field 34 and a destination node identifier field 36 which store the source and destination node addresses. A live field 38 indicates how far (how many hops) the BQ control packet 18 will propagate away from the source node 20 transmitting the packet 18. The BQ packet 18 then has a series of intermediate node address fields 40 and associated route qualities fields 42 provided. Each route qualities field 42 stores information about the route 30 at its corresponding intermediate node 22. More particularly, the route qualities field 42 stores the neighbouring node's address 26, the corresponding number of associativity ticks 28, a route relaying load value 43, and a forwarding delay measure 44. The BQ packet 18 also includes a sequence number field 45 which stores a unique identifier for each packet and allows seen tables to prevent duplicate packet transmission. Finally, the end of the packet is identified by a cyclic redundancy check field 46 which enables the integrity of the received packet 18 to be confirmed.

Figure 6C:
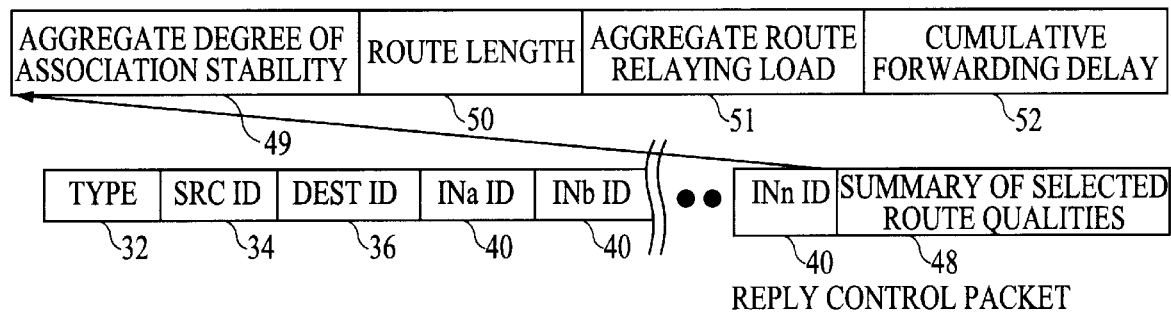
FIG. 6c is a block diagram showing the format of a REPLY control packet used in the embodiment of the present invention.
Figure 6B:
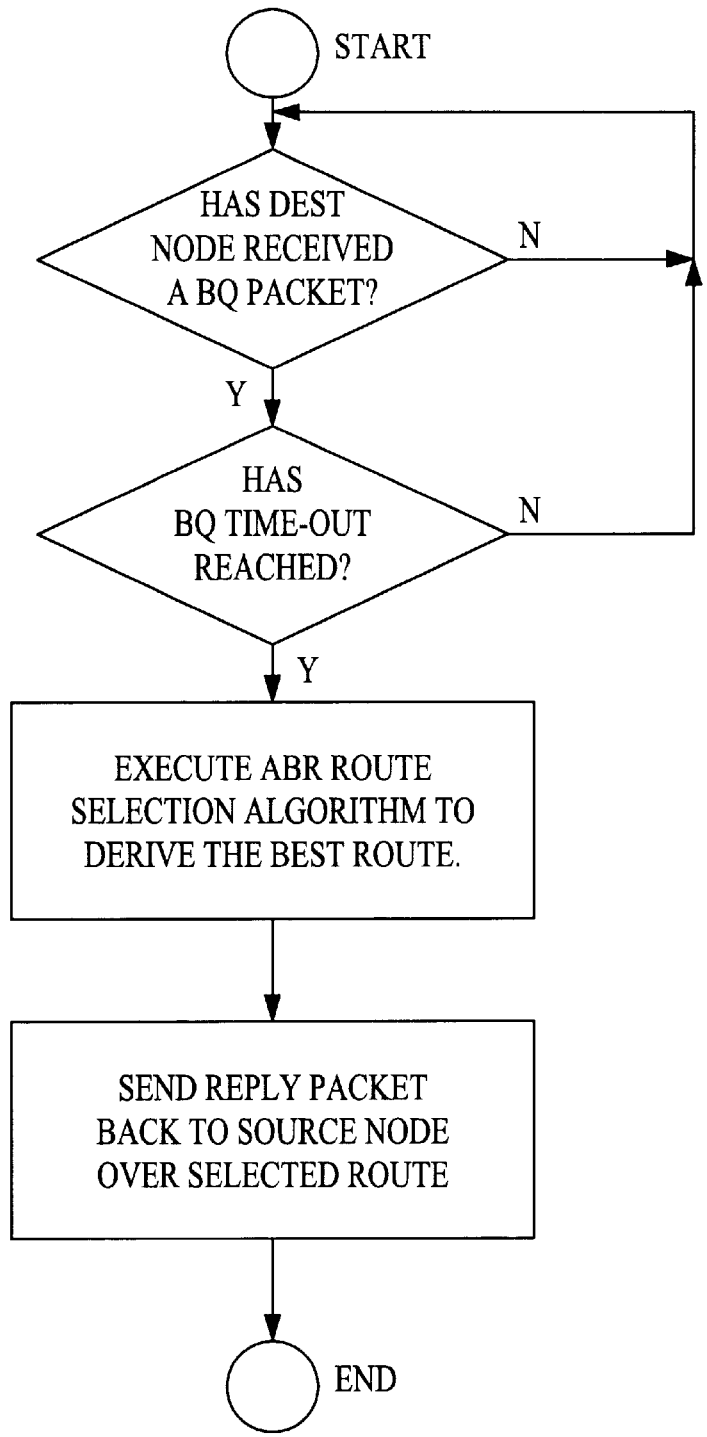
FIG. 6b is a flow diagram showing the steps involved in the route discovery procedure at the destination node of the embodiment of the present invention.

The destination node 24 will, at an appropriate time after receiving the first BQ packet 18, know all the possible routes 30 and their qualities. Given a set of possible routes 30 from the source node 20 to the destination node 24, if a route 30 consists of mobile hosts having a high number of associativity ticks 28 (thereby indicating association stability), then that route 30 will be chosen by the destination node 24, despite other less stable but shorter hop routes. However, if the overall degrees of association stability of two or more routes 30 are the same, then the route with the minimum number of hops will be chosen. If multiple routes 30 have the same minimum-hop count, then the route 30 with the least delay is selected. An ABR route selection algorithm, which is executed at the destination node 24, is formally set out in Table 1. In addition, FIG. 6b shows the above described steps involved in carrying out the Route Discovery at the destination node 24.

The route parameters that govern the ABR route selection are: (a) degree of association stability, (b) route relaying load, (c) route length and (d) cumulative forwarding delay. The forwarding delay refers to all processing, queuing, carrier sensing and transmission delays. Forwarding delay measurements are exponentially smoothed and stored on a per-neighbour mobile host basis, as in PRNs. The cumulative forwarding delay, therefore, reflects the end-to-end delay of the route concerned. Note that Table 1 presents a possible ABR route selection algorithm. However, the order of "route filtering" (i.e., which route metrics are regarded as more important than others) may change and is dependent upon the application quality of service specification.

Once the destination node 24 has selected the best route a REPLY packet 47 is sent back to the

TABLE 1

Let $S_i$ be the set of possible routes from SRC→DEST, where $i = 1, 2, 3 \ldots$
Let $RL_j^i$ be the relaying load in each node $j$ of a route in $S_i$, where $j = 1, 2, 3 \ldots$
Let $RL_{max}$ be the maximum route relaying load allowed per MH.
Let $AT_{threshold}$ be the min. associativity ticks required for association stability.
Let $AT_j^i$ represent the associativity ticks in each node $j$ of a route in $S_i$.
Let $H_i$ represent the aggregate degree of association stability of a route in $S_i$.
Let $L_i$ represent the aggregate degree of association instability of a route in $S_i$.
Let $H_{i_{ave}}$ represent the average degree of association stability of a route in $S_i$.
Let $L_{i_{ave}}$ represent the average degree of association instability of a route in $S_i$.
Let $Y_i$ represent the number of nodes of a route in $S_i$ having acceptable route relaying load.
Let $U_i$ represent the number of nodes of a route in $S_i$ having unacceptable route relaying load.
Let $Y_{i_{ave}}$ represent the average acceptable route relaying load factor.
Let $U_{i_{ave}}$ represent the average unacceptable route relaying load factor.
Let $CFD_i$ represent the cumulative forwarding delay of a route in $S_i$.
Begin
    For each route $i$ in $S_i$
    Begin
    $a \leftarrow 0$
        For each node $j$ in route $S_i$
        Begin
            If $(AT_j^i \geq AT_{threshold})H_i$++; else $L_i$++;
            If $(RL_j^i \geq RL_{max})U_i$++; else $Y_i$++;
            a++;
        End
        $H_{i_{ave}} = H_i/a; L_{i_{ave}} = L_i/a; U_{i_{ave}} = U_i/a;$ i $Y_{i_{ave}} = Y_i/a;$
    End
    <u>Best Route Computation</u>
    Let the set of acceptable routes with $U_{i_{ave}} = 0$ and $H_{i_{ave}} \neq 0$ be $P_1$, where $P_1 \subseteq S_i$
    Begin
        * <u>Find Route With Highest Degree of Association Stability</u> *
        Compute a route $k$ from $P_n$ with $H_{k_{ave}} > H_{l_{ave}}, \forall\ l \neq k.$
        or if a set of routes $K_n$ exists such that $H_{K1_{ave}} = H_{K2_{ave}} \ldots = H_{KP_{ave}}$
        where $n = \{1,2,3,\ldots,p\}$
        Begin
            * <u>Compute Minimum Hop Route Without Violating Route Relaying Load</u> *
            Compute a route $K_k$ from $K_n$ with $Min\{K_k\} < Min\{K_m\}, \forall\ m \neq k.$
            or if a set of routes $K_o$ exists such that $Min\{K_1\} = Min\{K_2\} \ldots = Min\{K_q\}$,
            where $o = \{1,2,3,\ldots,q\}$
            Begin
                * <u>Multiple Same Associativity & Minimum-Hop Routes Exists</u> *
                Select a minimum-hop route $K_k$ from $K_0$ with minimum CFD
                or
                * <u>Multiple Same Associativity, Minimum Hop & Minimum CFD Exists</u> *
                Begin
                    Arbitrarily select a route from the remaining set.
                End
            End
        End
    End
End source node 20 via the route 30 selected. This causes the intermediate nodes 22 in the route 30 to mark their routes to the destination node 24 as valid. All other possible routes are then inactive and will not relay packets destined for the destination node 24 even if they hear the transmission. This, therefore, avoids duplicated packets from arriving at the destination node 24. Once a route has been selected, each of the intermediate nodes 22 in the network can be classified as active if it supports the chosen route 30 or inactive if it does not support the chosen route 30.

While the BQ packet 18 propagates to the destination node 24 each intermediate node 22 relaying the BQ packet 18 will know its hop count from the source node 20. Likewise, when the REPLY packet 47 propagates back to the source node 20, the intermediate nodes 22 can also compute their distances to the destination node 24. The REPLY packet 47 is variable in length and has the format shown in FIG. 6c.

The REPLY packet 47 is similar to the BQ packet 18 but omits the live field 38, the sequence number field 45 and each of the route qualities fields 42. Rather, after the series of intermediate node addresses 40, a summary field 48 is provided. The summary field 48 stores a summary of the selected route qualities such as aggregate degree of association stability 49, route length 50 and aggregate route relaying load 51.

When the REPLY packet 47 reaches the source node 20, the route 30 is established. The source node 20 can then proceed with data transmission over this route 30, where packets will be forwarded from one intermediate node 22 to another until they arrive at the destination node 24. Issues related to packet header and routing table formats, data acknowledgement and re-transmission are discussed later in this description.

Route Reconstruction (RRC) Phase

In the ABR protocol, the selected route 30 is more likely to be long-lived due to the property of associativity. However, if unexpected moves do occur, the RRC phase procedures will attempt to quickly locate an alternative valid route without resorting to a broadcast query unless necessary. The RRC phase of the ABR protocol essentially performs four operations: partial route discovery; invalid route erasure; valid route update; and new route discovery (in the worst case). These operations may be invoked by any of the four node moves mentioned earlier.

Figure 7B:
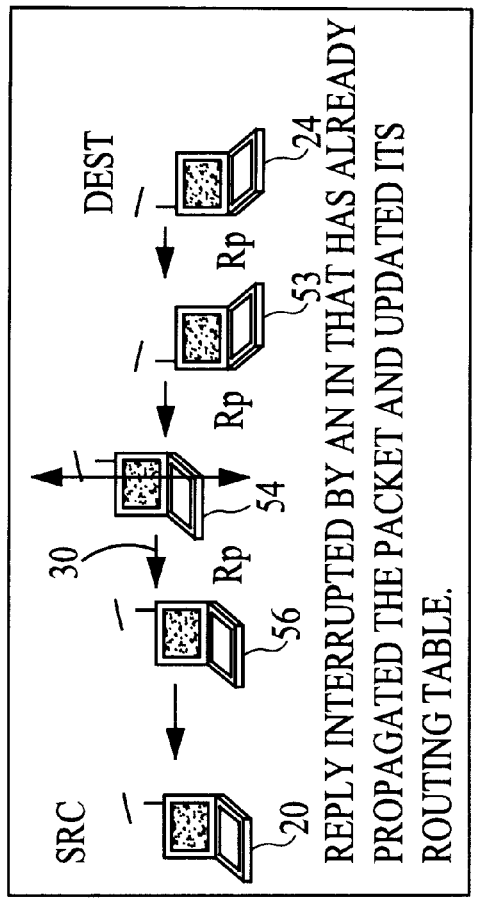
FIGS. 7a and 7b are schematic diagrams showing how interruptions in a REPLY packet propagation route are dealt with in the embodiment of the present invention.
Figure 7A:
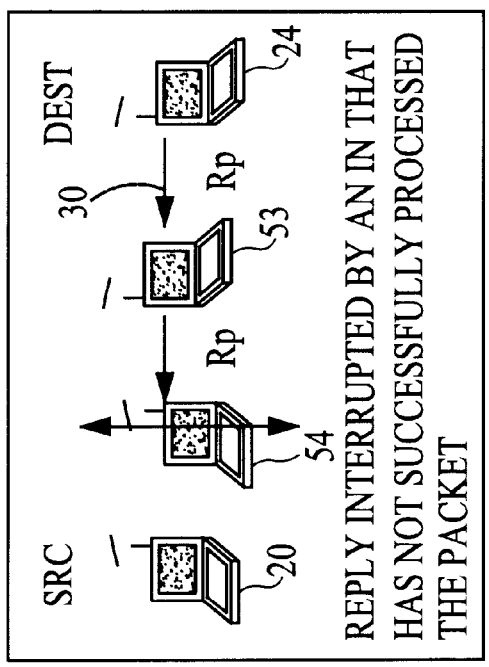

Referring now to FIGS. 7a and 7b, the way in which the RRC phase can be invoked during the BQ-REPLY cycle is explained. There may be some rare instances when the source node 20 never receives the REPLY packet 47 because of some unexpected "not-yet-selected" intermediate node's 54 movement as shown in FIG. 7a. In such circumstances, the source node 20 will eventually time out (BQ-TIMEOUT) and send another BQ packet 18. Since the downstream neighbour 53 of the migrating intermediate node 54 realises the associativity change, it will send a route notification packet in the downstream direction, deleting all the downstream nodes' invalid routing table entries. Another situation occurs when a selected intermediate node 54 moves while the REPLY packet propagation is still in progress (see FIG. 7b). The upstream neighbour 56 of the migrating node 54 will perform a localised query process to discover a new partial route, while the downstream neighbour 53 sends a route notification packet towards the destination node 24, thereby erasing all invalid downstream nodes' routing entries.

Figure 8A:
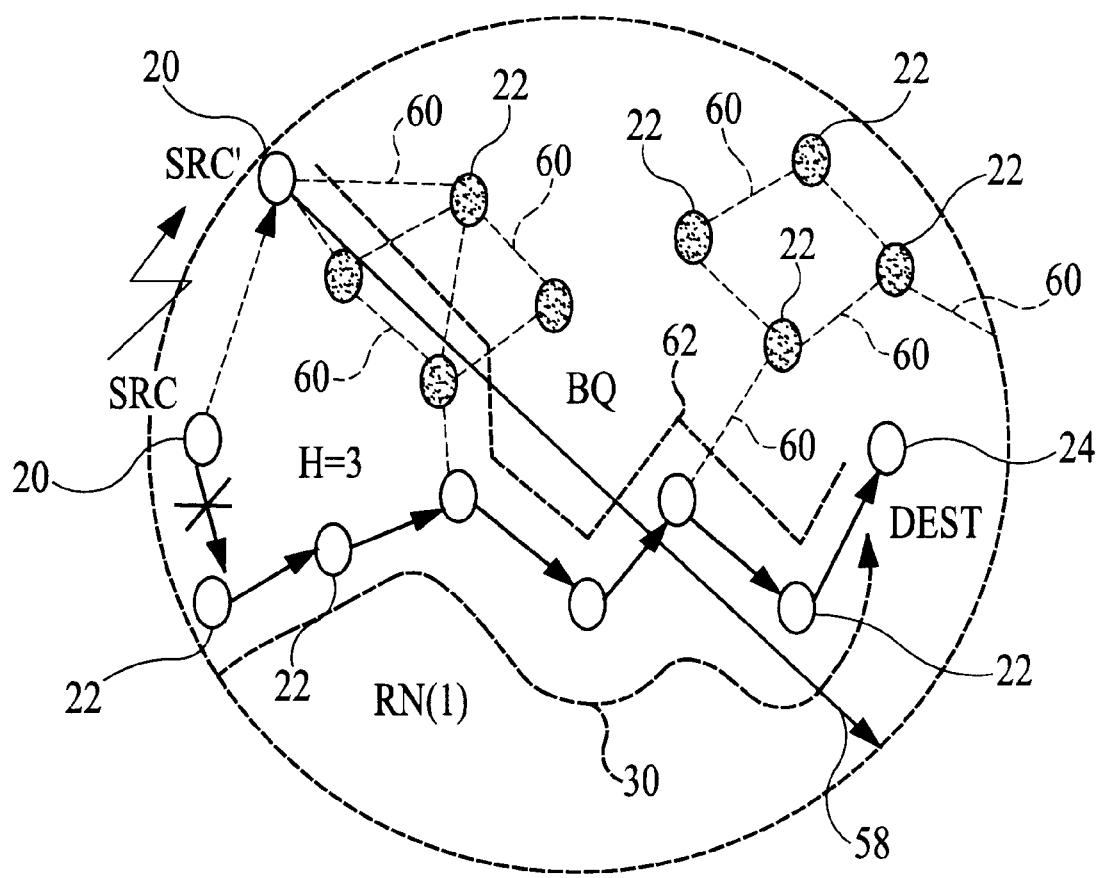
FIGS. 8a, 8b and 8c are schematic network diagrams respectively showing how a Route Reconstruction Phase of the embodiment of the present invention operates when a source, destination and intermediate mobile host migrate.
Figure 8B:
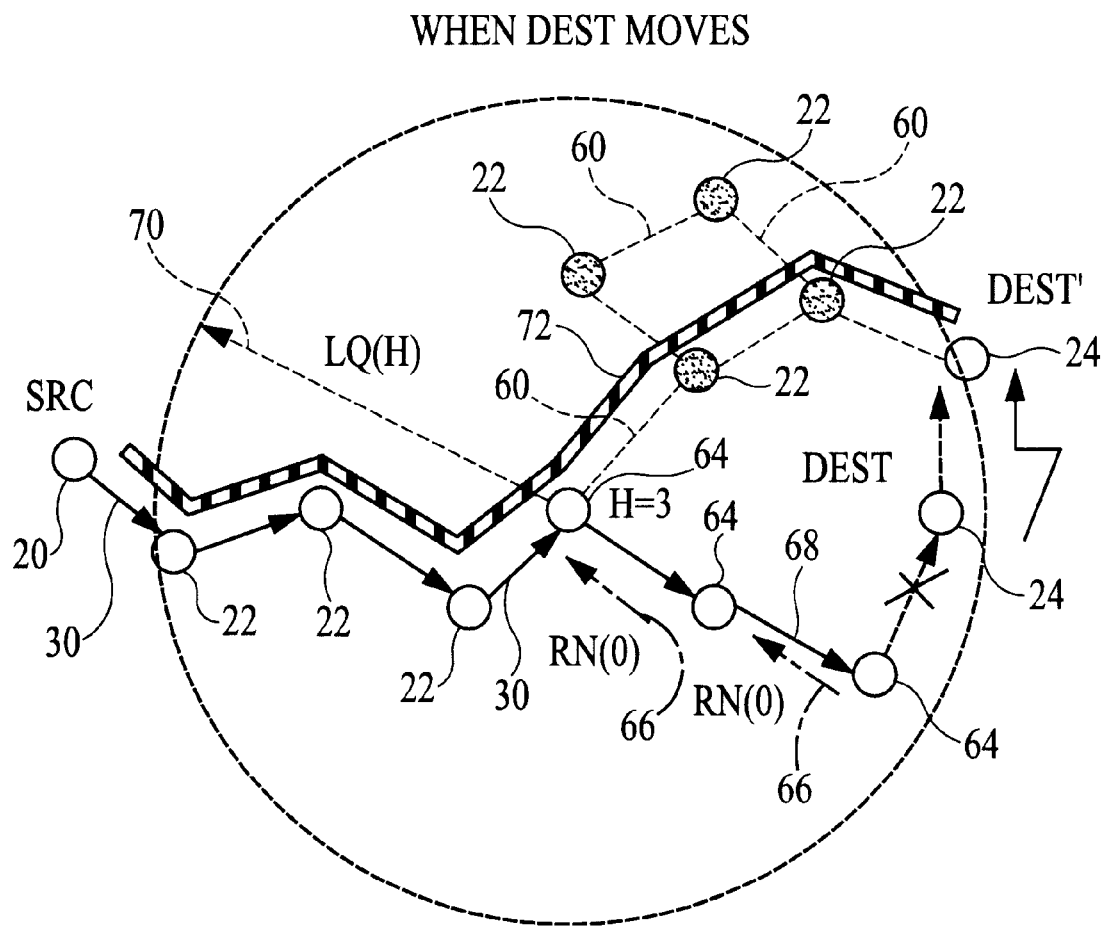
Figure 8C:
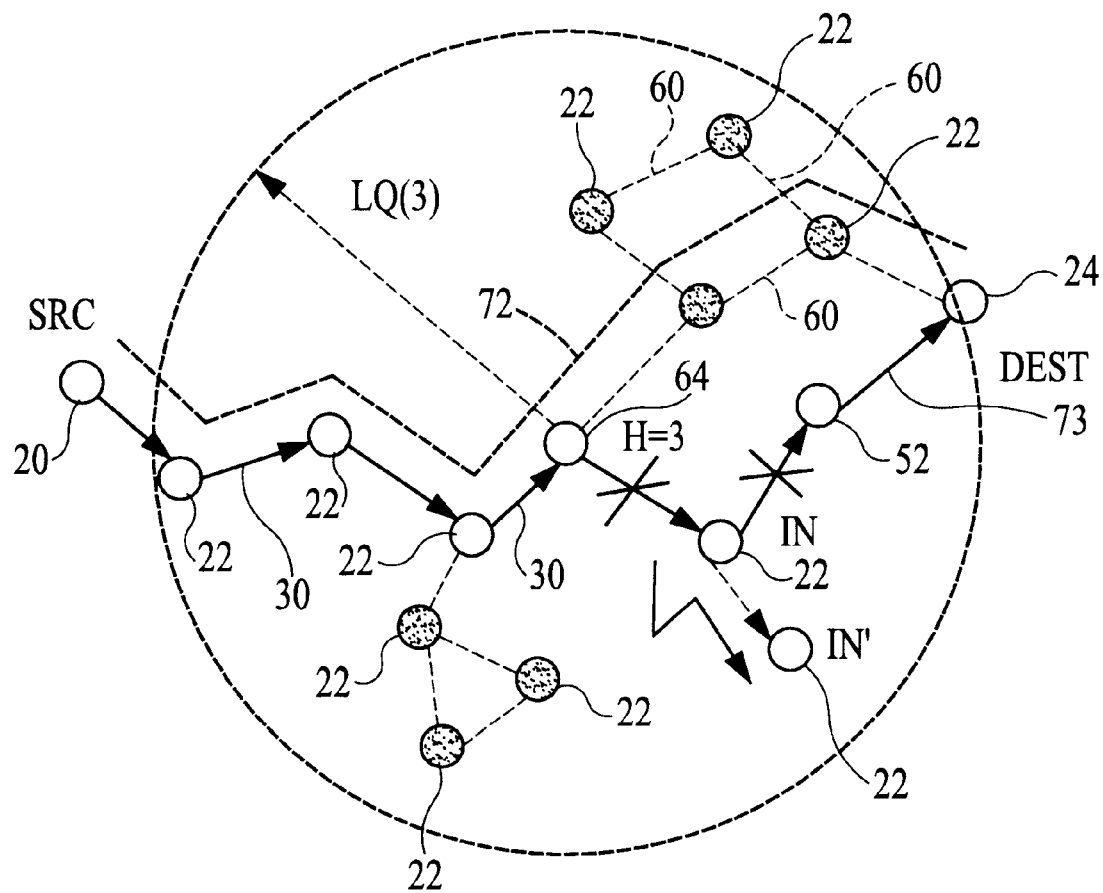

Turning now to the consequence of node movements after a valid route 30 has been established by the BQ-REPLY cycle, FIGS. 8a, 8b and 8c show respectively how the movements of the source node 20, the destination node 24 and intermediate nodes 22 are dealt with in the RRC phase.

FIG. 8a shows a network of mobile hosts comprising a source node 20, a destination node 24, intermediate nodes 22 and the various communication links 60 therebetween. The valid route 30 from source node 20 to destination node 24 has previously been established by a broadcast query. In the event of any movement by the source node 20, the RRC phase carries a route reinitialisation process via a broadcast query 58. This is the simplest and most efficient way of establishing a new route 62 to the destination node 24 and it also advantageously avoids multiple RRC phase conflicts as a result of concurrent nodes' movements.

Referring now to FIG. 8b, when the destination node 24 moves, the destination node's immediate upstream neighbour 64, or so called pivoting node 64, will erase its route. The pivoting node 64 then performs a localised query (LQ[H]) process to ascertain if the destination node 24 is still reachable. "H" here refers to the hop count from the pivoting node 64 to the destination node 24. If the destination node 24 receives the localised query (LQ) packet, it will select the best partial route and send a REPLY packet back to the pivoting node 64, otherwise a time out period (LQ_TIMEOUT) will be reached and the pivoting node 64 will backtrack 66 to the next upstream node.

During the backtrack, the new pivoting node 64 will erase the route through that link 68 and perform a LQ[H] process 70 until the new pivoting node 64 is greater than half the route length, i.e., $hop_{src-dest}$, away from the destination node 24 or when a new partial route 72 is found. If no partial route 72 is found, the pivoting node 64 will send a Route Notification (RN) control packet back to the source node 20 to initiate a BQ-REPLY cycle.

Figure 9A:
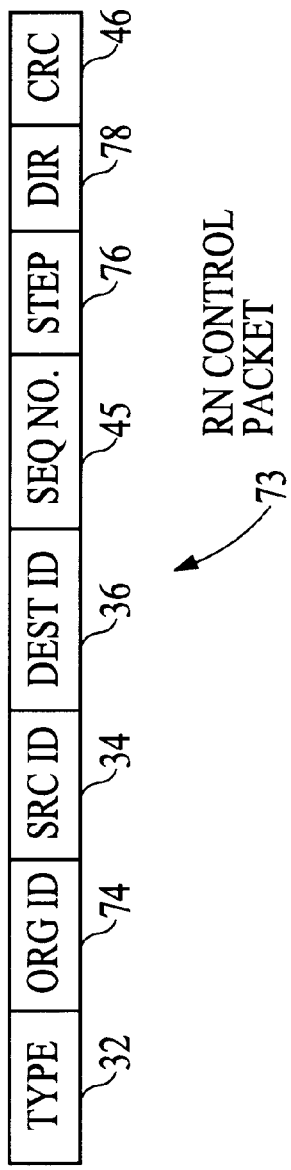
FIGS. 9a and 9b are block diagrams showing the respective formats in an RN control packet, an LQ control packet and an RD control packet used in the embodiment of the present invention.
Figure 9B:
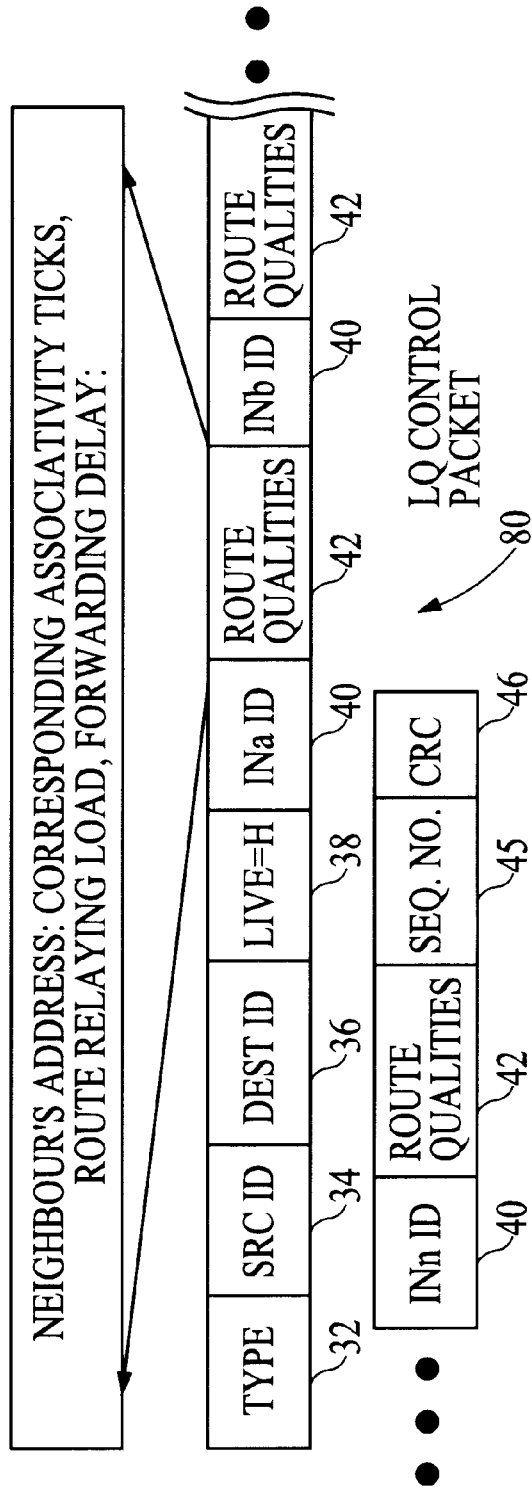

While the RN control packet is fixed in length, the LQ packet is not. The formats of the RN and LQ control packets are shown in FIGS. 9a and 9b respectively. The RN control packet 73 comprises an ORG ID field 74 which stores the pivoting node address and a STEP flag 76 which indicates the type of route notification that is to be carried out. When STEP=0 in the RN control packet 73, the backtracking process 66 is to be performed one hop at a time (in the upstream direction), while when STEP=1 this implies that the RN control packet 73 will be propagated straight back to the source node 20 to invoke a BQ-REPLY cycle or to the destination node 24 to erase invalid routes. The RN control packet 73 also comprises a DIR flag 78 which serves to indicate the direction of RN[1] propagation. The RN control packet 73 further includes the following previously explained fields: type 32, source address 34, destination address 36, sequence number 45 and cyclic redundancy check 46.

The LQ control packet 80 has exactly the same format as the BQ control packet 18 of FIG. 6a. However, the live field 38 is always set to be the Hop count value H.

Referring to FIG. 8c, the "upper arm" of a route refers to the intermediate nodes 22 and the destination node 24 that contribute to half the route length from source node 20 to the destination node 24. When any intermediate node 22 moves, its pivoting node 64 removes its outgoing node entry and its immediate downstream neighbour 52 propagates a RN[1] control packet 73 towards the destination node 24, thereby deleting all the subsequent downstream nodes' invalid routing entries.

An LQ[H] process is then invoked by the pivoting node 64 to locate alternate partial routes to the destination node 24. The destination node 24 may receive multiple LQ control packets 80, hence it selects the best partial route and returns a REPLY packet 47 to the pivoting node 64. This causes all intermediate nodes 22 between destination node 24 and the pivoting node 64 to update their routing tables. On receiving the REPLY packet 47, the pivoting node 64 updates its routing table entries and appends the next hop (outgoing) node ID into the data packet. This ensures that only one partial route is selected.

The LQ[H] process 70 is performed based on a suitable H value. If the pivoting node 64 is X hops away from the destination node 24 via the previous active route 30, then H=X will be used in the hope that the destination node 24 is still within X hops range (reachable via other paths) or shorter. This procedure, therefore, attempts to rebuild partial paths of equal or shorter lengths with respect to the previous partial path that existed, i.e., route optimisation is built into the RRC phase.

However, if no partial route exists, LQ_TIMEOUT will expire and a RN[0] control packet 73 will be sent by the pivoting node 64 to the next upstream node 22, and the cycle repeats until the next pivoting node 64 has a hop count greater than half $hop_{src-dest}$ or when a new partial route to the destination node 24 is found.

The "lower arm" refers to the source node 20 and the intermediate nodes 22 that contribute to half the route length from the source node 20 to the destination node 24. If any of these nodes moves, a RN[1] control packet 73 is propagated downstream towards the destination node 24, and the pivoting node 64 performs an LQ[H] process 70 and awaits the destination node's REPLY packet 47. If no REPLY packet 47 is received, an RN[0] control packet 73 is sent to the next upstream node 64 and the new pivoting node 64 then invokes the LQ[H] process 70 again, but with a different value of H. This cycle continues until the new pivoting node 64 is the source node 20 (where the BQ-REPLY cycle is initiated to discover a new route) or a partial route to the destination node 24 is found.

Figure 8D:
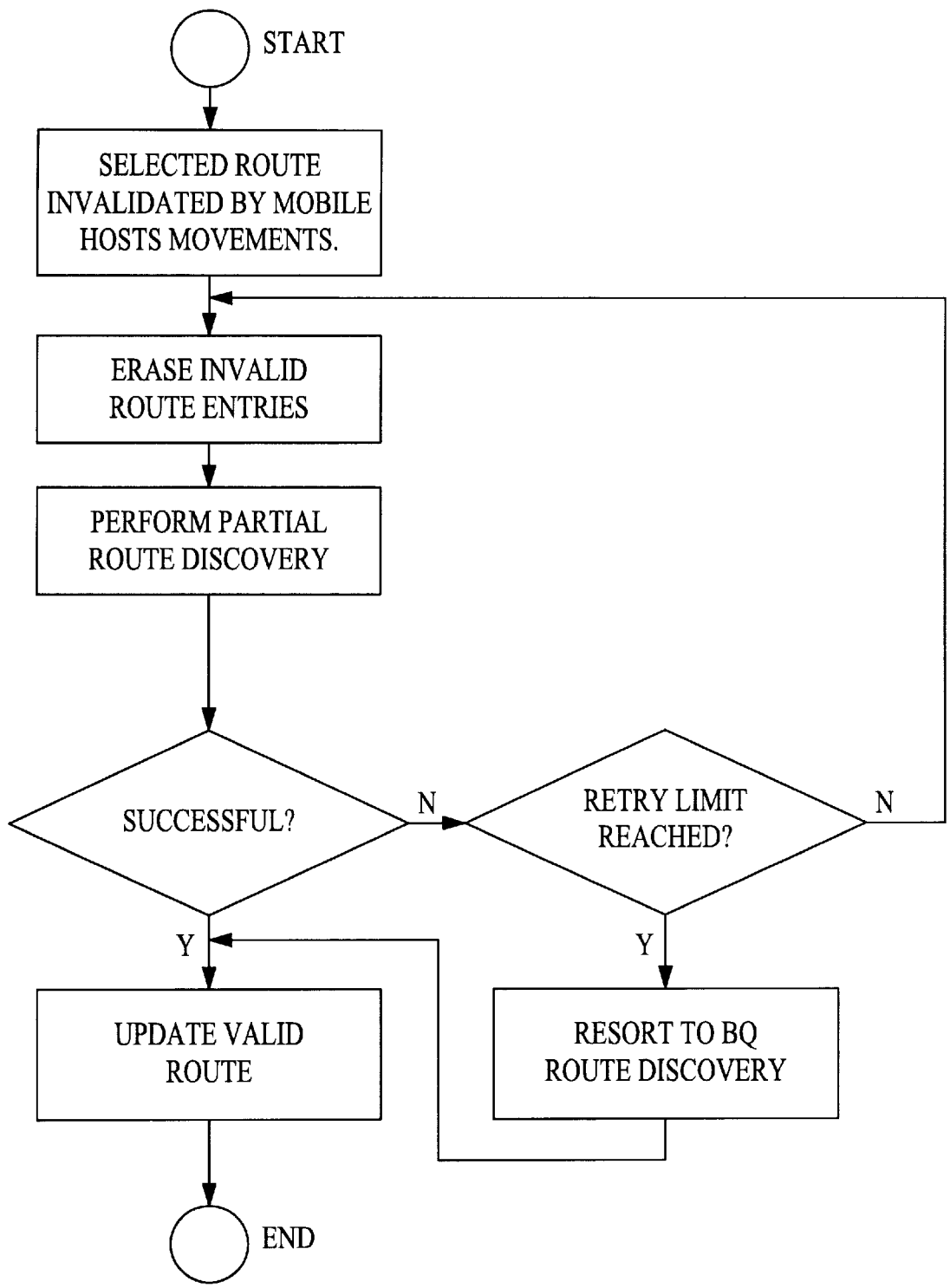
FIG. 8d is a flow diagram showing the steps involved in the Route Reconstruction Phase of the embodiment of the present invention when an active intermediate node or the destination node move out of range.

A flow diagram showing the steps carried out in the RRC phase which is carried out when an active intermediate node 22 or the destination node 24 moves, is shown in FIG. 8d.

The migration of a subnet-bridging mobile host 16 beyond the radio coverage of its neighbouring mobile hosts 2 will cause the mobile subnet 13 to be partitioned (see FIG. 2). If an existing route 30 does not span across the fragmented subnets 14,15, the route 30 is not affected and only the subnet-bridging mobile host's upstream and downstream neighbours need to update their route and associativity entries. All other mobile hosts remain ignorant and do not perform any route updates. However, if existing routes 30 span across subnets i.e., the subnet-bridging mobile host 16 is an intermediate node 22 of the route 30, then the route 30 is invalidated as the destination node 24 is no longer reachable, despite any LQ process 70 or BQ-REPLY cycle attempts. Under such circumstances, the localised query and route notification cycle will eventually inform the source node 20 about the partitioning and the source node 20 can then invoke BQ-REPLY cycles several times or it can inform the mobile user about the partitioning and prompt him or her to try later.

Race conditions exist due to multiple invocations of RRC procedures as a result of concurrent movements by the source node 20, the destination node 24 and intermediate nodes 22. The following explains how the ABR of the present embodiment is immune to "multiple-RRC procedures" conflicts and how one RRC procedure is valid ultimately.

Destination Node Migration RRC Procedure Interrupted by Upstream Intermediate Node Migration When the destination node 24 moves and while the RRC procedure is in progress, any upstream intermediate node moves will cause their respective downstream neighbours' route to be deleted. The new pivoting node 64 nearest to the source node 20 will perform the RRC procedure and all other RRC procedures will be passive when they hear the new LQ broadcast for the same route. Hence, only one RRC procedure is valid.

Upper-Arm Intermediate Node Migration RRC Procedure Interrupted by Lower Arm Intermediate Node Migration This situation is resolved in the same way as the above-mentioned situation. Note that the same argument can be applied to the case when a LQ process 70 has to be aborted and a RN[1] control packet 73 has to be sent to the source node 20 to invoke a BQ-REPLY cycle but is hindered due to some upstream intermediate node's movements. The new pivoting node 64 nearest to the source node 20 will swamp the earlier RRC procedures by invoking a new LQ process 70.

Lower-Arm Intermediate Node Migration RRC Procedure Interrupted by Upper Arm Intermediate Node Migration While a lower arm intermediate node migration RRC procedure is taking place, any movements by any upper arm intermediate nodes 22 will not result in a LQ[H] or a RN[1] process being initiated since a lower arm intermediate node 22 has earlier sent an RN[1] control packet 73 downstream to erase invalid routes. If the RN[1] control packet 73 does not succeed in propagating to the destination node 24, the LQ[H] process 70 initiated by the lower arm intermediate node 22 will also serve to delete these invalid routes.

Intermediate Node Migration RRC Procedure Interrupted By Destination Node Migration This has no effect on the RRC procedure, as the LQ[H] process 70 uses a localised query approach to locate the destination node 24. Once the destination node 24 is associatively stable and is reachable from the pivoting node 64, the RRC procedure will be successful.

Intermediate Node Migration RRC Procedure Interrupted By Source Node Migration

While lower or upper arm intermediate node migration RRC procedure is in progress, any moves by the source node 20 will result in a BQ-REPLY cycle, which will swamp out all on-going localised query, REPLY and route notification processes related to that route. Hence, unfruitful and stale RRC procedures will not continue and a new route will be discovered via the BQ-REPLY cycle.

Source and Destination Nodes Moving Away from Intermediate Nodes

When this occurs, RRC procedures as a result of destination node and source node migration will be initiated. However, the BQ-REPLY cycle initiated by the source node 20 will again swamp out all unnecessary ongoing RRC procedures.

Destination Node Migrating Into Source Node's Radio coverage Range

When the destination node 24 migrates, RRC procedure is achieved via the LQ[H] process 70. However, when the destination node 24 is within the source node's radio coverage range, packet duplicates will result at the destination node 24 since the destination node 24 now receives packets from the source node 20 directly and also from the original source node 20 to destination node 24 route. Hence, to avoid packet duplicates and non-optimal routes, the source node 20, on discovering that the destination node is within range and is in stable state, will send a RN[1] control packet 73 downstream to erase the existing route and will re-establish a new single hop route with the destination node 24.

During a LQ-propagation and REPLY-await process, if any of the upstream nodes (i.e., lower arm intermediate nodes 22 ) break up, an RN[1] control packet 73 will be propagated downstream, erasing all the downstream intermediate nodes' route entries. The existing pivoting node 64 will ignore any subsequent REPLY to its LQ process. The new pivoting node 64 will resume with a new LQ and REPLY process. It should be noted that downstream nodes' migrations are not of concern during the LQ and REPLY process.

In ABR, no attempt is made to retain alternate routes, as maintaining them causes overhead. Only one route will be selected and only one route is valid for a particular route request. The avoidance of using alternate routing information means that problems associated with looping due to intermediate nodes having stale routes are absent and there is no need for periodic network-wide broadcast and route updates.

Any alternate route will have to be discovered via a LQ or BQ process, which may give rise to better (shorter hop and long-lived) routes. The destination node 24, on receiving multiple BQ or LQ packets, will select the best route and reply to the source node 20. During the LQ-REPLY-RN cycle, invalid intermediate nodes 22 routes are erased by RN[1] control packets 73 and intermediate nodes 22 forming the new partial route will have their route entries updated when they have relayed the REPLY packet 47 from the destination node 24 to the pivoting node 64. If the LQ-REPLY-RN cycle fails, the subsequent new pivoting node 64 will have its route entries erased by RN[0] packet 73 during the backtrack process 66. If all the possible backtrack LQ-REPLY-RN cycles fail, all the upstream nodes will have their route entries erased via RN[0] and RN[1] control packets 73 and the source node 20 will then revert back to the BQ-REPLY cycle.

Finally, for the case of a BQ process, any intermediate nodes 22 receiving a BQ packet 18 and having invalid routes will have their invalid routes erased, therefore ensuring that no invalid routes exist in the intermediate nodes 22.

Route Deletion Phase

When a discovered route 30 is no longer desired, a route delete (RD) broadcast is initiated by the source node 20 so that all intermediate nodes 22 update their routing table entries. A full broadcast is used as compared to directed broadcast. Since the nodes in a route 30 change during the RRC phase, using a directed broadcast is unsuitable unless the source node 20 is always informed about any changes to the route 30.

Figure 9C:
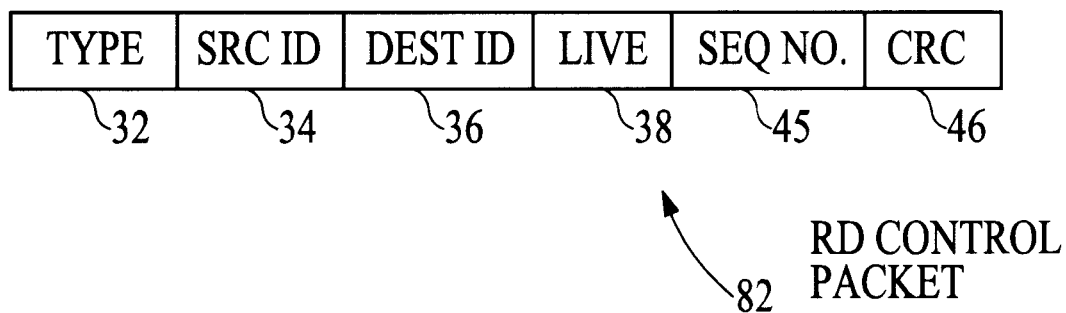

FIG. 9c shows the format of an RD control packet 82. The RD control packet 82 has the following fields which have previously been discussed regarding the BQ control packet 18 and the RN control packet 73: type 32, source node address 34, destination node address 36, live 38, sequence number 45 and cyclic redundancy check 46. Similar to the BQ control packet 18, the RD control packet 82 has the live field 38 set to ∞ to achieve a full wave broadcast.

Having described the procedures involved in ABR, the formats of the packet headers and of the tables provided at each mobile host are now described hereinafter.

Since a long packet header results in low channel utilisation efficiency, each data packet header only contains the neighbouring node routing information, not all the nodes in the route. Each intermediate node 22 renews the next-hop information contained in the header before propagating the packet upstream or downstream. Hence, a hybrid routing scheme which is a combination of broadcast and point-to-point routing is realised. The purpose of some of the individual fields of the packet header is summarised in Table 2.

A typical routing table of a node supporting existing routes is shown in Table 3. The table reveals that every node supporting on-going routes will map incoming packets from a particular upstream node to the corresponding out-going downstream node. Every node will also keep track of its distance (hop count) to the destination node 24 and a record of the total routes that it is currently supporting.

The neighbouring or associativity table is usually updated by the data-link layer protocol, which will generate, receive and interpret identifier beacons from the neighbouring mobile hosts 2 or base stations and pass this information up to the higher protocol layers. Nomadic collaborative applications can then utilise the neighbouring table information to update their participants' present and absent lists. The structure of a neighbouring table is shown in Table 4.

While the BQ process is activated via a radio broadcast, the LQ query process is invoked via a localised broadcast. To prevent mobile hosts 2 from

TABLE 2

Packet Header

| Routing Header Field | Function |
| --- | --- |
| SRC ID | Packet Forwarding |
| DEST ID | Route Identification |
| Sequence No. | Duplicates Prevention, Uniqueness |
| Service Type | Packet Priority |
| Last IN | Passive Acknowledgement |
| Next IN | Duplicates Prevention, Routing |
| Current IN | Acknowledgement Routing |

TABLE 3

Routing Table

| Destination Node | Source Node | Incoming IN | Outgoing IN | Distance |
| --- | --- | --- | --- | --- |
| $N_a$ | $N_x$ | $N_z$ | $N_j$ | 4 |
| $N_k$ | $N_y$ | $N_i$ | $N_o$ | 3 |
| Total no. of active routes supported (Relay Load): | | | 2 | |

TABLE 4

Neighbouring Table

Figure 10:
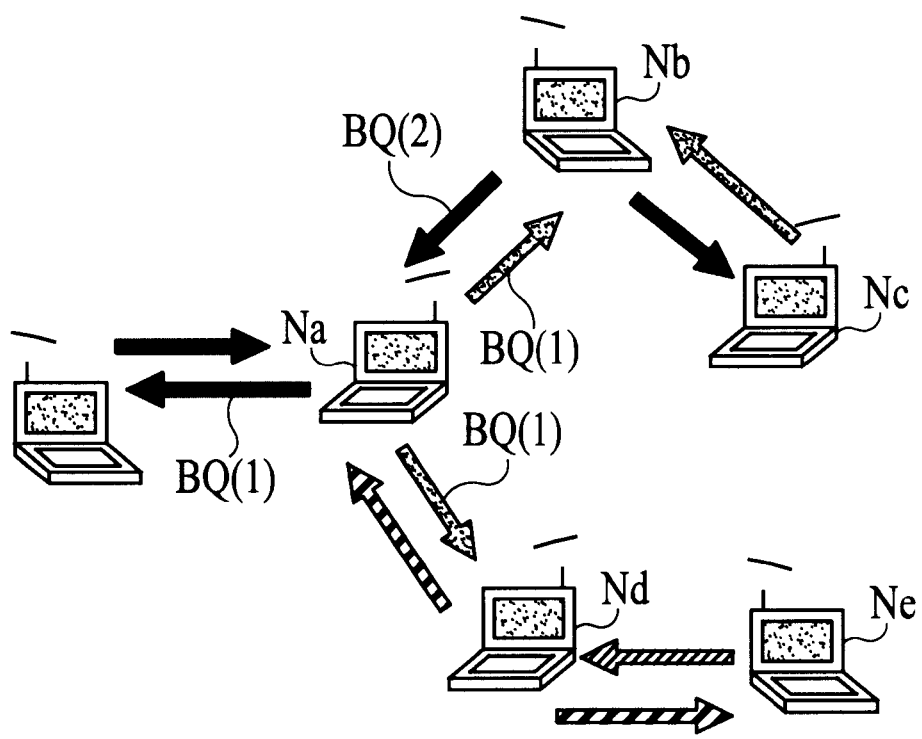
FIG. 10 is a schematic diagram showing how the BQ seen table entry is erased in the embodiment of the present invention.

| Neighbours | Associativity Ticks (units) | Forwarding Delay (msecs) |
| --- | --- | --- |
| $N_a$ | 5 | 70 |
| $N_b$ | 15 | 40 | processing and relaying the same BQ, LQ or RD packet 18, 80 or 82 twice, BQ, LQ and RD seen tables are provided. If the received control packet type 32, route identifier source and destination node addresses 34,36 and sequence number 45 match an entry in the seen table list, then the packet is discarded. The contents of these seen tables is erased after a certain time-out period. This time-out period is long enough to allow a mobile host's neighbours to forward the BQ, LQ or RD control packet 18, 80, 82 to their corresponding neighbours, as illustrated in FIG. 10. More particularly, a mobile host Na having transmitted it BQ(1) control packet to its neighbours Nb, Nd, will hear transmissions from those neighbours Nb, Nd, when they forward the BQ(2) control packets to their neighbours. Hence, the BQ(2) packets will be ignored by the mobile host Na. The BQ(1) entry in the BQ control seen table of mobile host Na, is not erased until at least after the end of the period of receiving passive acknowledgements from all of the neighbours Nb, Nd of the mobile host Na.

On the other hand, because the REPLY and RN control packets 47,73 utilise directed broadcast (since intended recipients' addresses are contained in the control packet), seen tables for these packets are not necessary.

Turning now to data flow acknowledgement and packet transmission, the present embodiment of the invention implements end-to-end flow control by adopting the scheme used in PRNs, namely a passive acknowledgement scheme for packets in transition. When a node receives a packet and performs relaying via a radio transmission to its neighbours, its previous neighbour that has sent it the packet will have heard the transmission and hence this is indirectly used as an acknowledgement to the packet sent. On the other hand, active acknowledgements will only be sent by the destination node 24 as it no longer has a neighbour to relay the packet to. Hence, this provides a data flow acknowledgement mechanism for packet forwarding in an ad-hoc mobile network, which is not present in any of the existing ad-hoc mobile routing schemes (other than PRNs).

Figure 11:
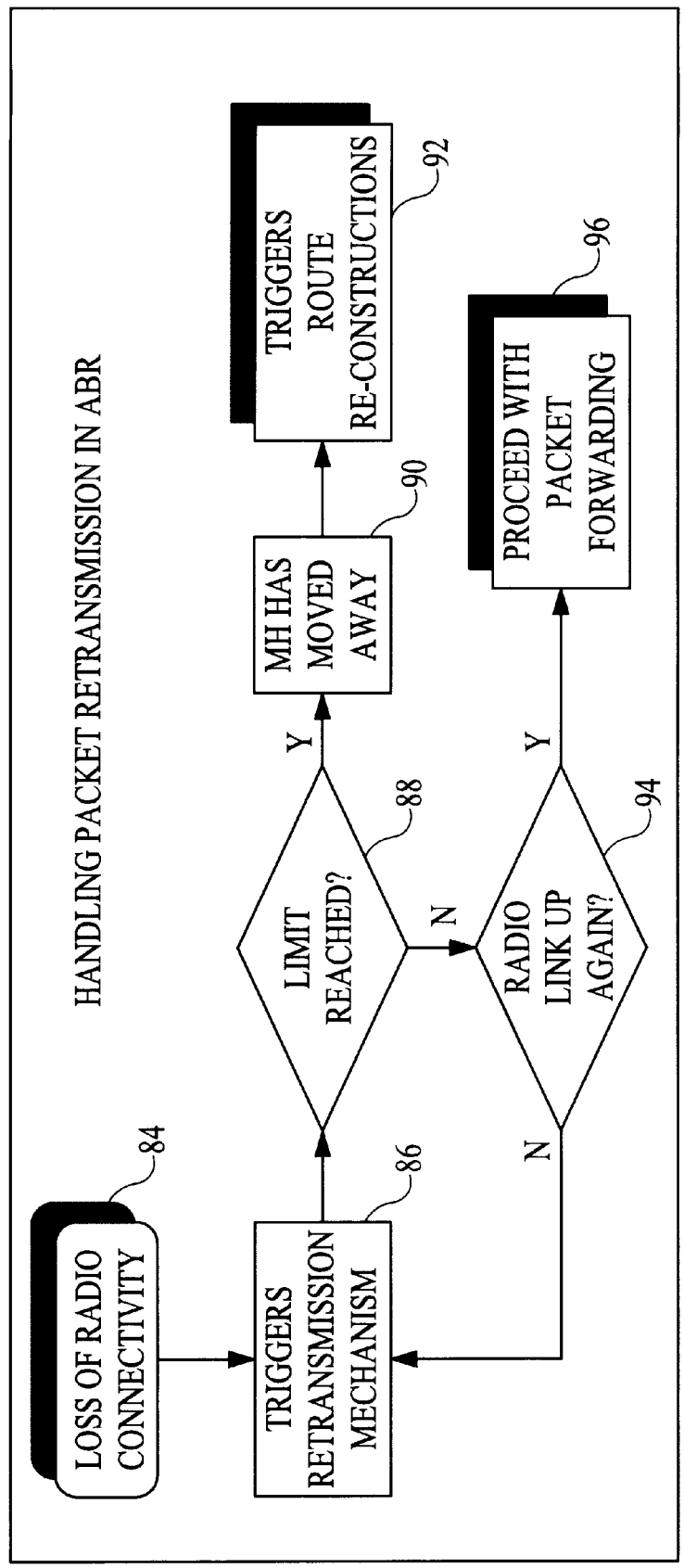
FIG. 11 is a flow diagram showing how packet retransmission is handled in the embodiment of the present invention.

Referring now to FIG. 11, while the data flow acknowledgement scheme allows forwarded packets to be acknowledged, there are situations where the acknowledgements never reach the intended receiver. This can be a result of radio interference which causes a sudden loss of radio connectivity at 84.

Hence, if a mobile host 2 has forwarded a packet and does not receive an acknowledgement within a certain time interval, it retransmits at 86 the packet for a maximum of X times. The mobile host checks at 88 to see if the limit of X transmissions has been reached and if so, the neighbouring mobile host is considered to be out of reach at 90 and RRC procedures at 92 are invoked. If, however, the check for a radio link-up at 94 is positive, the packet forwarding procedure at 96 continues. Otherwise, the packet is retransmitted again at 86.

The present embodiment of the invention includes a host discovery mechanism. When an associativity is formed (through recognising a neighbouring mobile host's identifier beacon), a mobile application controlling the network is informed of the new mobile user who can then participate in nomadic collaborative computing. This can, for example, simply appear as an icon on the user's screen which when clicked, reveals details of the new participant. The new associativity of one mobile host with another can also be propagated to the nodes' neighbours, so that all other neighbouring mobile hosts within the mobile subnet can be made aware of the existence of the new user. Alternatively, a mobile host can choose only to be aware of its immediate neighbours and can later perform an on-demand neighbour discovery broadcast when it desires to communicate with mobile hosts outside its vicinity. As a result of network connectivity, a mobile host can also discover what services are available from which other mobile hosts.

The assessment of the quality of a particular route, as is carried out in the BQ process at the destination node 24 on receiving BQ packets 18, requires analysis of various routing qualities. Conventionally, routes are assessed by the following qualities: (a) fast adaptability to link changes (recovery time), (b) minimum-hop path to the destination, (c) end-to-end delay, (d) loop avoidance and (e) link capacity. Some protocols prioritise the fast adaptability characteristics by carrying out frequent broadcasts in order to obtain fast route convergence. However, fast adaptability at the expense of excessive radio bandwidth consumption is undesirable. Furthermore, the qualities of a good route should not be based solely on the number of hops and the end-to-end delay. Rather, the new routing metrics which are used in the present embodiment are listed in Table 5.

The longevity of a route is important, because the merits of a shorter but short-lived route will be denigrated due to frequent data flow interruptions and the need for route reconstructions. In addition, even relaying load distribution is important in an ad-hoc mobile network, as no one particular mobile host

TABLE 5

New Routing Metrics

- Longevity of a Route (i.e., Degree of Association Stability)
- Relaying Load of INs Supporting Existing Routes
- Knowledge of Link Capacities of the Selected Route should be unfairly burdened to support many routes and perform many packet-relaying functions. This latter characteristic also helps to alleviate the possibility of network congestion. Finally, since the associativity of a mobile host with its active or inactive neighbours and the route relaying load, i.e. the total number of active routes supported by the mobile host also reflect the number of contenders within a wireless cell, the approximate aggregated throughput (link capacities) for the selected route can be made known to the mobile user prior to transmission, therefore allowing the user to either proceed with or abort the transmission.

The present embodiment can also be integrated with Wireless Local Area Networks (WLANs) which incorporate base stations (BS). In fact, it is desirable for a mobile host to be able to function in both ad-hoc or BS-oriented WLAN environments and this is one of the functional specifications laid down by the IEEE 802.11 committee. When a mobile host receives identifying beacons generated by other mobile hosts, it automatically invokes the ad-hoc routines to support mobile-to-mobile communication. However, when it receives identifier beacons generated by the base stations, the mobile host knows that it has access to a wired network and hence conventional routing protocols supported by location management, registration, handovers, etc., can be invoked. The mobile application controlling the network can be made intelligent enough to decide which communication mode, i.e. ad-hoc or BS-oriented, best suits the service requirements.

In addition, both ad-hoc and BS-oriented modes can be combined to provide fault tolerance in a BS-oriented WLAN against base stations' failures. More particularly, when a mobile host sees a base station, its associativity ticks with the base station will be high. But these associativity ticks will be reset on the base station's failure (equivalent to an associated node moving away). Hence, under such circumstances, the mobile host can apply associativity-based ad-hoc routing to re-route its packets to its neighbouring mobile hosts who may have access to other base stations.

The present embodiment can also incorporate a dynamic cell size adjustment scheme. High associativity of a node (mobile host) with other nodes enhances its communication capability and produces shorter hop routes. However, an increase in the number of active nodes in a wireless cell can cause greater contention for the available wireless bandwidth, resulting in lower throughput per mobile host. In an environment which is congested with mobile hosts, it is possible to dynamically adjust the transmission power of each mobile host such that both the cell size and the number of neighbours are reduced in order to achieve a reasonably high throughput while still maintaining acceptable routing performance. It has also been shown earlier by Takagi and Kleinrock that spatial channel reuse obtained by reducing mobile host transmission power to a level where only a few neighbours are within range, gives rise to an improved throughput.

Hence, the throughput of a wireless network depends on the media access control (MAC) protocol (such as ALOHA, GRAP and CSMA) and the spectrum bandwidth allocation strategies. While dynamic cell adjustment allows the wireless cell capacity associated with each ad-hoc mobile host to be increased, the formation of longer routes may result in longer end-to-end delay. There is also an increased probability that the ad-hoc mobile network will be partitioned into multiple subnets.

The dynamic cell size adjustment scheme of the present embodiment is activated when a mobile host finds itself in a congested environment (i.e., having many neighbours and heavily loaded with route relaying functions), contending for the limited available wireless bandwidth. Based on the mobile host's knowledge of which neighbouring mobile hosts are active (i.e., supporting routes similar to itself) and which are not, and the distances of these neighbouring mobile hosts from itself (computed from the received power levels of identifier beacon signals), the mobile host can dynamically reduce its transmission range to exclude inactive neighbours, i.e. those mobile hosts which are not part of the selected route, but include all currently active neighbours, i.e. those neighbours which are part of the selected route 30.

In this manner, the dynamic cell size adjustment scheme of the present embodiment does not affect the operation of the ABR protocol. Existing routes remain unaffected and no RRC phases need to be invoked due to the wireless cell size reduction. This advantageously gives rise to a reduction in the transmission power of the mobile host and to an increase in capacity over a given area (due to less beaconing traffic and fewer contenders). This dynamic cell size adjustment scheme is only advantageous when used with the ABR protocol because the gain in power reduction and bandwidth enhancement is only substantial if the route is associatively stable.

Table 6 summarises the procedures of the ABR protocol of the present embodiment under different So far, the ABR protocol is concerned with discovering routes from the source node to the destination node. However, for bi-directional traffic, the routes for each source can be different. In this situation, the RRC process for each stream is performed independently, even though the moves can sometimes be related to a common mobile host.

Whilst there has been shown and described an embodiment of a routing method in accordance with the present invention, it will be appreciated that the described embodiment is exemplary only and is susceptible to modification and variation without departure from the spirit and scope of the invention as set forth in the appended claims. For example, the present ABR protocol considers routes with the highest degree of association stability and acceptable route relaying load as the most important quality of service metrics, followed by minimum-hop routes and routes with minimum cumulative forwarding delay. However, the order of route filtering in ABR route selection can be changed in accordance to the application quality of service requirements. If minimum cumulative forwarding delay and throughput are regarded as more important factors, then the protocol can be arranged such that these metrics override the others.

The specification of the order of quality of service importance has to be mapped to the underlying routing protocol in some manner. After the mapping, it is possible to append such quality of service requirements into the BQ and LQ control packets 18,80 during the full and partial route discovery processes so that the destination node 24 can be informed of the desired quality of service requirements. In particular, during a RRC process, it is desirable for the pivoting node 64 to retain the user specified quality of service requirements that it has learned during the processing of the earlier BQ control packet 18 so that this information can be appended in the LQ control packets 80 to be broadcast.

Figure 12:
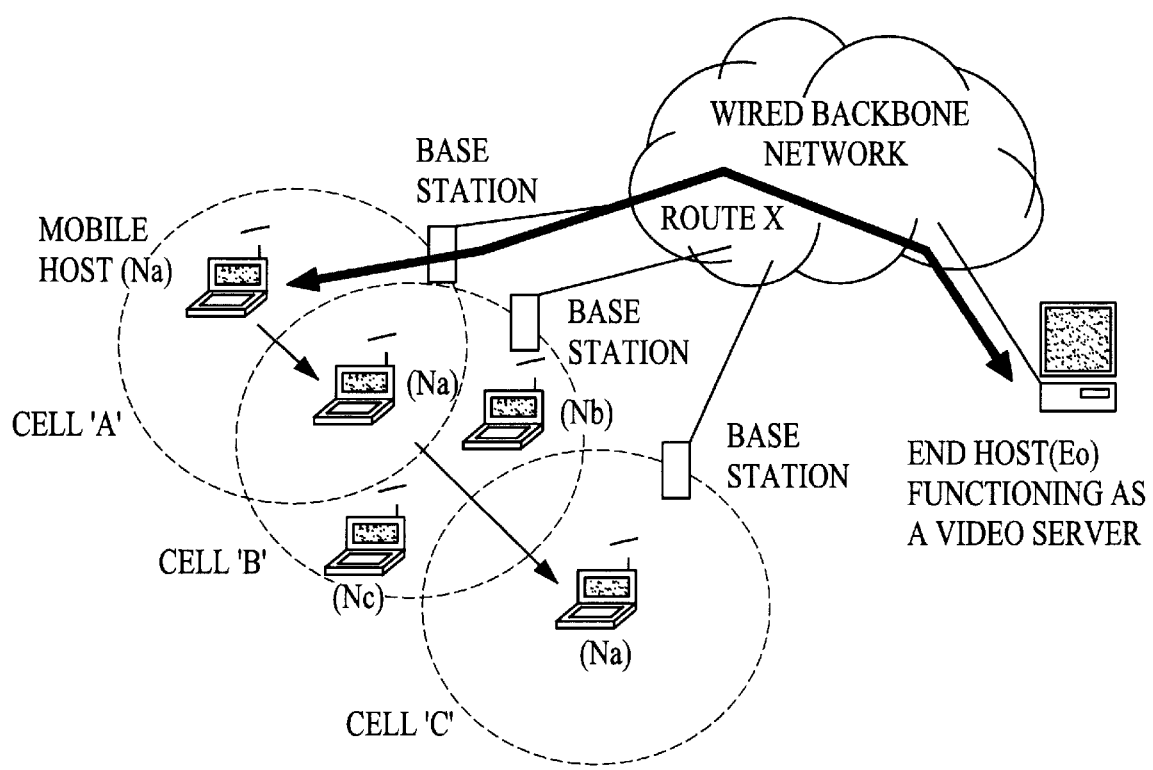
FIG. 12 is a schematic diagram showing the application of the associativity principle to the task of network resource adaptation in a base station wireless local area network.

The principle of associativity can also be applied to base station oriented Wireless LANs in the sense of network resource adaptation. For example, as shown in FIG. 12, a mobile host Na initiates a communication session with end host Eo over route X. The mobile host Na could be viewing a video sent by end host Eo (which is say a video server). We will assume that the wireless Cell 'A's current available wireless resources fulfil the need for transporting this video stream from the end host Eo to the mobile host Na.

TABLE 6

| Associativity Valid | | | | Associativity Violated | | |
|---|---|---|---|---|---|---|
| No Route | INs & DEST Moves | | SRC Moves | Subnet Bridging MH Moves | | Concurrent Moves |
| Re-Constructions Are Needed | Normal Case LQ-REPLY Cycle Success | Worst Case BQ-REPLY Cycle Success | BQ-REPLY Cycle Success | Route Within Subnet No Route Re-Constructions Are Needed | Route Spans Across Subnets Network is Partitioned. BQ-Reply Cycle will retry before aborting | Ultimately Only One Route Re-Construction Cycle is Valid | mobile hosts' associativity states. The outstanding feature is that no RRC procedures are needed so long as the property of inter-dependent associativity remains valid. When this property is violated, the protocol will invoke a LQ or BQ process to quickly locate alternate routes.

However, when the mobile host Na moves to wireless Cell 'B', this cell 'B' could be crowded with many other mobile hosts (such as Nb and Nc) and hence the available resources could be insufficient to support this on-going video application running on mobile host Na. Instead of forcing the application to terminate, one strategy could be to degrade the resource requirement to a lower value. This means that the video image viewed at mobile host Na in Cell 'B' could be of a lower resolution or a smaller image size.

When mobile host Na migrates to Cell 'C' which let us say has abundant available resources, then there is a need for upgrade. If mobile host Na is merely transiting through Cell 'C', it is not advisable to perform a resource upgrade. This can be detected by checking if the number of associativity ticks of mobile host Na is greater than "A threshold" 12 (see FIG. 2). If mobile host Na is associatively stable, then it is worthwhile to perform a resource upgrade. This upgrade will involve refreshing the resources allocated at the links (wired and wireless) supporting the route. The video application will now have a better resolution or a larger video size than when it was at Cell 'B'.

I claim:

1. A routing method for supporting ad-hoc mobile communications within a communications network, the network comprising a plurality of mobile hosts including a source mobile host and a destination mobile host and a plurality of wireless communication links connecting together said mobile hosts, said method comprising:
   periodically transmitting an identifier signal by each of said plurality of mobile hosts in the network and receiving said identifier signals via said communication links between said mobile hosts;
   measuring the stability of said communication links between said mobile hosts in accordance with the number of times said identifier signals are received from an associated mobile host via said communication links;
   selecting a communications route through the network from the source mobile host to the destination mobile host based on the stability of said communications links; and
   transmitting an information signal from said source mobile host across said network via said selected communications route to said destination mobile host, wherein said step of selecting a communications route comprises
      transmitting broadcast query signals from the source mobile host across the network;
      appending route information to the broadcast query signals regarding the status of mobile hosts transmitting the broadcast query signals:
      receiving and evaluating the broadcast query signals at the destination mobile host,
      selecting a route through the network based on the stability of the communications links between mobile hosts; and
      transmitting a route identifier signal along the selected route through the network from the destination mobile host to the source mobile host.

2. A routing method according to claim 1, wherein said communications links comprises radio frequency communication links.

3. A routing method according to claim 1, further comprising providing an associativity table at each mobile host, each said associativity table storing regularly updated information regarding the stability of each communications link between said mobile host and its associated mobile hosts.

4. A routing method according to claim 1, further comprising providing information relating to the forwarding delay of each said communications link between said mobile host and its associated mobile hosts.

5. A routing method according to claim 1, further comprising providing a routing table at each mobile host, each said routing table being configurable to set a route for passing said information signal through said mobile host from one of its said associated mobile hosts to others of its said associated mobile hosts.

6. A routing method according to claim 5, wherein each mobile host represents a node of the communications network and each said routing table stores information regarding a source node, a destination node, an incoming associated node, an outgoing associated node and the distance of said mobile host from the destination node.

7. A routing method according to claim 1, wherein the network supports a plurality of selected routes between respective source and destination mobile hosts, each mobile host in the network being able to handle a plurality of selected routes and being able to store route relaying load information regarding the total number of selected routes supported by said mobile host.

8. A routing method according to claim 7, wherein said step of selecting communications route also comprises considering the route relaying load information stored in the mobile hosts.

9. A routing method according to claim 1, further comprising:
   providing a seen table at each mobile host, said seen table recording identifier data regarding an information signal which has passed through said mobile host; and
   using said seen table to recognise and discard information signals that have previously been passed through said mobile host.

10. A routing method according to claim 1, wherein said information signal is provided in data packets, each data packet being arranged to hold routing information, control information and message information.

11. A routing method according to claim 1, further comprising providing a data flow acknowledgment mechanism comprising passive acknowledgments, each said passive acknowledgment comprising receiving at a mobile host an information signal previously sent by the mobile host to one of its associated mobile hosts and retransmitted back thereby.

12. A routing method according to claim 11, wherein said data flow acknowledgment mechanism further comprises active acknowledgments, each said active acknowledgment occurring when an information signal has reached its intended destination and retransmission would not occur passively, said active acknowledgment comprising the mobile host receiving an active retransmission of an information signal sent by the mobile host to its associated mobile host acting as the destination node.

13. A routing method according to claim 11 or 12, further comprising retransmitting said previously sent signal from said mobile host to said associated mobile host if a passive or active acknowledgment is not received within a predetermined time out period.

14. A routing method according to claim 1, further comprising:
   appending quality of service information to the broadcast query signals, the quality of service information containing criteria on route selection which are taken into account on selecting a route through the network.

15. A routing method according to claim 1, wherein said route identifier signal configures mobile hosts along the selected route to pass forthcoming information signals between said source mobile host and said destination mobile host.

16. A routing method according to claim 1, further comprising reconstructing the selected route in response to a change in the stability of one said communication links indicating a broken communication link invalidating the selected route.

17. A routing method according to claim 16, wherein mobile hosts along the selected route are configured to pass forthcoming information signals between the source mobile host and the destination host and said step of reconstructing the selected route comprises:

identifying a pivot mobile host in the selected communications route adjacent the broken communication link;

transmitting a localised query signal from the pivot mobile host across the network;

appending route information to the localised query signal regarding the status of mobile hosts passing the localised query signal;

receiving and evaluating the localised query signals at the destination mobile host;

selecting a new partial route through the network from the pivot mobile host to the destination mobile host, the selection being based on the stability of the communications links therebetween; and configuring mobile hosts along the new partial route to pass forthcoming information signals between the source mobile host and the destination mobile host.

18. A routing method according to claim 17, further comprising:

appending quality of service information to the localised query signal, the quality of service information containing criteria on route selection which are taken into account on selecting a route through the network.

19. A routing method according to claim 17, wherein said step of reconstructing the selected route further comprises:

reconfiguring the mobile hosts that were previously configured to be part of the selected route but which are not now part of the new partial route, to not be a part of the reconstructed selected route.

20. A routing method according to claim 16, wherein said step of reconstructing the selected route comprises:

transmitting broadcast query signals from the source mobile host across the network;

appending route information to the broadcast query signals regarding the status of mobile hosts passing the broadcast query signals;

receiving and evaluating the broadcast query signals at the destination mobile host;

selecting a route through the network based on the stability of the communications links between mobile hosts; and transmitting a route identifier signal along the selected route through the network to the source mobile host.

21. A routing method according to claim 20, further comprising:

appending quality of service information to the broadcast query signals, the quality of service information containing criteria on route selection which are taken into account on selecting a route through the network.

22. A routing method according to claim 16, wherein said step of reconstructing the selected route further comprises:

(a) identifying a pivot mobile host in the selected communications route adjacent to the broken communication link;

(b) determining the distance between the identified pivot mobile host and the destination mobile host;

if the distance is greater than half the distance between the source mobile host and the destination mobile host, transmitting a broadcast query signal from the source mobile host across the network;

appending route information to the broadcast query signal regarding the status of mobile hosts passing the broadcast query signals;

receiving and evaluating the broadcast query signal at the destination mobile host;

selecting a route through the network based on the stability of the communication links between the mobile hosts; and transmitting a route identifier signal along the selected route through the network to the source mobile host;

or otherwise:

transmitting a localised query signal from the pivot mobile host across the network; and appending route information to the localised query signal regarding the status of mobile hosts passing the localised query signal.

23. A routing method according to claim 22, wherein said step of reconstructing the selected route further comprises:

(c) determining whether the localised query signal is received by the destination mobile host within a predetermined time period;

if the localised query signal is received by the destination mobile host within the predetermined time period evaluating the localised query signal at the destination mobile host-selecting a new partial route through the network form the pivot mobile host to the destination mobile host, the selection being based on the stability of the communication links therebetween and configuring mobile hosts along the new partial route to pass forthcoming information signals between the source mobile host and the destination mobile host;

or otherwise:

identifying a new pivot mobile host in the selected communication route adjacent to the previous identified pivot mobile host, and carrying out step (b) on the basis of the new identified pivot mobile host.

24. A routing method according to claim 23, wherein step (c) is repeated until the destination mobile host either receives the localised query signal or the broadcast query signal.

25. A routing method according to claim 1, wherein mobile hosts along the selected route are configured to pass forthcoming information signals between the source mobile host and the destination host, further comprising deleting the selected route when it is no longer required, said deleting step comprising transmitting a deletion signal from the source mobile host across the network, said deletion signal reconfiguring each mobile host in the network.

26. A routing method according to claim 1, wherein said routing method is arranged for use with fixed base station wireless local area networks as a back-up communications system in case of base station failure.

27. A routing method according to claim 1, further comprising providing means for dynamically adjusting the transmission power of mobile hosts in the network in heavy usage conditions such that the number of relatively lightly-used communications links of a given mobile host can be reduced thereby increasing the throughput of said mobile host.

28. A routing method according to claim 1, further comprising discovering a new mobile host and incorporating the new host into the communication network, said incorporating step comprising:

detecting the presence of the new mobile host to any of the mobile hosts of the communications network by measuring the stability of said communication links between the new mobile host and an associated mobile host; and establishing a communications link between the new mobile host and its associated mobile host.

29. A routing method according to claim 28, further comprising:

determining the services provided by the new mobile host; and notifying the mobile hosts in the communications network of the discovery of the new mobile host and of the availability of its services.

30. In a base-station oriented wireless local area network comprising a plurality of mobile hosts, a wired network, a static host and a plurality of base stations, the static host and said base stations each being connected to the wired network, said base stations each having an associated wireless communications area within which the base station can communicate with one or more mobile hosts, and wherein said mobile host having established a first communications link with the static host via a first base station, migrates into a second wireless communications area of a second base station which is too heavily used to support a second communications link of the same bandwidth as the first, a method of re-establishing communications between said migrating mobile host and said static host, said method comprising:

establishing a second communications link between the mobile host and the static host via the second base station, said second communications link having a bandwidth which is reduced from that of the first communications link;

measuring the stability of the migrating mobile host with respect to said base stations using an associativity based characteristic; and when the mobile host moves in to a new wireless communications area which is less heavily used than the second wireless communications area and the measured stability between the new base station and the mobile host is above a predetermined limit, establishing a new communications link between the mobile host and the static host via the new base station which has an increased bandwidth as compared to that of the second communications link.

* * * * *